United States Patent
DiMaria et al.

(10) Patent No.: US 11,706,342 B2
(45) Date of Patent: *Jul. 18, 2023

(54) SYSTEM AND METHOD FOR HYBRID CALLBACK MANAGEMENT

(71) Applicant: Virtual Hold Technology Solutions, LLC, Akron, OH (US)

(72) Inventors: Matthew DiMaria, Brentwood, TN (US); Nicholas James Kennedy, Akron, OH (US); Robert Harpley, Akron, OH (US); Daniel Bohannon, Livermore, CA (US); Shannon Lekas, Cushing, TX (US)

(73) Assignee: VIRTUAL HOLD TECHNOLOGY SOLUTIONS, LLC, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/076,323

(22) Filed: Dec. 6, 2022

(65) Prior Publication Data

US 2023/0098873 A1 Mar. 30, 2023

Related U.S. Application Data

(63) Continuation-in-part of application No. 17/336,405, filed on Jun. 2, 2021, now Pat. No. 11,522,997, which is a continuation of application No. 17/011,248, filed on Sep. 3, 2020, now Pat. No. 11,032,424, which is a continuation-in-part of application No. 16/995,424, filed on Aug. 17, 2020, now abandoned, which is a continuation-in-part of application No. 16/896,108, filed on Jun. 8, 2020, now abandoned, which is a continuation-in-part of application No. 16/836,798, filed on Mar. 31, 2020, now Pat. No. 10,992,811, which is a continuation of application No. 16/542,577, filed on Aug. 16, 2019, now Pat. No. 10,609,218, said application No. 16/896,108 is a
(Continued)

(51) Int. Cl.
*H04M 3/00* (2006.01)
*H04M 3/523* (2006.01)
*H04L 67/306* (2022.01)
*H04M 3/51* (2006.01)

(52) U.S. Cl.
CPC ........ *H04M 3/5231* (2013.01); *H04L 67/306* (2013.01); *H04M 3/5183* (2013.01)

(58) Field of Classification Search
CPC .. H04M 3/5231; H04M 3/5183; H04L 67/306
USPC ....... 379/265.01–265.14, 255.01–266.1, 309
See application file for complete search history.

(56) References Cited

U.S. PATENT DOCUMENTS 6,215,173 B1 * 4/2001 Echigoya ............ H01L 23/5258
257/209
8,938,221 B2 1/2015 Brazier et al.
(Continued)

*Primary Examiner* — William J Deane, Jr.
(74) *Attorney, Agent, or Firm* — Galvin Patent Law LLC; Brian R. Galvin

(57) ABSTRACT

A system and method for hybrid callback management, utilizing a callback cloud and an on-premise callback system, allowing brands to utilize a hybrid system that protects against any premise outages or cloud service faults and failures by introducing redundancies and co-maintenance of data key to callback execution while allowing for mixed telephony types to be seamlessly integrated into one communication platform.

12 Claims, 26 Drawing Sheets

Related U.S. Application Data continuation-in-part of application No. 16/152,403, filed on Oct. 4, 2018, now abandoned, which is a continuation-in-part of application No. 16/058,044, filed on Aug. 8, 2018, now Pat. No. 11,012,568, which is a continuation-in-part of application No. 14/532,001, filed on Nov. 4, 2014, now Pat. No. 10,375,245, which is a continuation-in-part of application No. 13/659,902, filed on Oct. 24, 2012, now Pat. No. 8,938,221, which is a continuation-in-part of application No. 13/479,870, filed on May 24, 2012, now Pat. No. 9,055,149, and a continuation-in-part of application No. 13/446,758, filed on Apr. 13, 2012, now Pat. No. 8,792,866, which is a continuation of application No. 12/320,517, filed on Jan. 28, 2009, now Pat. No. 8,213,911, said application No. 13/479,870 is a continuation-in-part of application No. 12/320,517, filed on Jan. 28, 2009, now Pat. No. 8,213,911.

(60) Provisional application No. 62/858,454, filed on Jun. 7, 2019, provisional application No. 62/820,190, filed on Mar. 18, 2019.

(56) References Cited

U.S. PATENT DOCUMENTS

| | | |
|---|---|---|
| 9,143,614 B2 * | 9/2015 | Williams ............ H04M 3/5191 |
| 10,609,218 B1 | 3/2020 | Moller et al. |
| 2018/0376003 A1 | 12/2018 | Shinseki |

* cited by examiner

SYSTEM AND METHOD FOR HYBRID CALLBACK MANAGEMENT

CROSS-REFERENCE TO RELATED APPLICATIONS

Priority is claimed in the application data sheet to the following patents or patent applications, each of which is expressly incorporated herein by reference in its entirety:
Ser. No. 17/336,405
Ser. No. 17/011,248
Ser. No. 16/995,424
Ser. No. 16/896,108
Ser. No. 16/836,798
Ser. No. 16/542,577
62/820,190
62/858,454
Ser. No. 16/152,403
Ser. No. 16/058,044
Ser. No. 14/532,001
Ser. No. 13/659,902
Ser. No. 13/479,870
Ser. No. 12/320,517
Ser. No. 13/446,758
Ser. No. 12/320,517

BACKGROUND OF THE INVENTION

Field of the Art

The disclosure relates to the field of contact center technology, specifically to the field of cloud-implemented automated callback systems.

Discussion of the State of the Art

Many businesses use groups of service representatives for communicating with clients who initiate communications with the business, such as by telephone calls. To most efficiently use the time and skills of each service representative, the service representatives may be organized into groups based on a skill set. For example, the groupings may be based on the representative's ability to handle client issues such as the opening of new accounts, billing issues and customer service issues on existing accounts.

Typically, if a client calls such a business, voice prompt menu choices enable the calling client to identify the issue for which the client requires service and the client is then queued for a service agent capable of handling the identified issue. As such, it is expected that clients who identify the purpose of their call as a "billing issue" will be queued for, and connected to, a service representative with the ability to handle billing issues. Similarly, it is expected that clients who identify the purpose of their call as a "customer service issue" will be queued for, and connected to, a service representative with the ability to handle customer service issues.

There are problems with existing communications systems, such as contact centers, including the following two problems. First, the voice prompt menus that are used to channel callers to the queue for the appropriate group of service agents are exacerbating to a client at best. It takes significant time to navigate the layered menus of voice prompts.

Second, waiting on-hold while a connection, be it a phone call, web chat, video conference, or other interaction type, is maintained in queue for connection to a service agent is also exacerbating to a client at best.

In an effort to reduce customer exacerbation caused by having to maintain a connection while on-hold in queue, secondary queue systems have been developed. A typical secondary queue system obtains a telephone number at which the calling client can be reached when a service representative is available (i.e., a call back number). The client disconnects, and then, at the proper time, a call back system establishes a connection to the client utilizing the call back number and couples the client to an available representative without waiting on-hold in queue. One exemplary system is disclosed in U.S. Pat. No. 6,563,921 to Williams et al. which is commonly assigned with the present application.

While such a system may make the experience of waiting for a connection to a service representative slightly less exasperating, it does not address the inconvenience of having to navigate an irritatingly slow and usually complicated voice prompt menu to enter the queue.

What is needed is a system and various methods for providing a callback cloud and related services that overcome the limitations of the prior art noted above.

SUMMARY OF THE INVENTION

Accordingly, the inventor has conceived and reduced to practice, in a preferred embodiment of the invention, a system and methods for hybrid callback management. The following non-limiting summary of the invention is provided for clarity, and should be construed consistently with embodiments described in the detailed description below.

A system for hybrid callback management is disclosed, comprising: a callback cloud service comprising at least a processor, a memory, and a first plurality of programming instructions stored in the memory and operating on the processor, wherein the first programming instructions, when operating on the processor, cause the processor to: maintain relevant agent and brand data from an on-premise callback system; execute callback requests; calculate estimated wait times for callbacks; and an on-premise callback system comprising at least a processor, a memory, and a second plurality of programming instructions stored in the memory and operating on the processor, wherein the second programming instructions, when operating on the processor, cause the processor to: send data related to callback objects and agents to a callback cloud service; create a callback object upon a consumer requesting a call back; execute callbacks between consumers and agents at a specified time; and connect the two parties, when the two first and second called parties are online, and delete the callback object.

A method for hybrid callback management is disclosed, comprising the steps of: maintaining relevant agent and brand data from an on-premise callback system, using the callback cloud service; executing callback requests, using the callback cloud service; calculating estimated wait times for callbacks, using the callback cloud service; sending data related to callback objects and agents to the callback cloud service, using the on-premise callback system; creating a callback object upon a consumer requesting a call back, using the on-premise callback system; executing callbacks between consumers and agents at a specified time, using the on-premise callback system; and connecting the two parties, when the two first and second called parties are online, and deleting the callback object, using the on-premise callback system.

According to an aspect of an embodiment, a broker server comprising at least a processor, a memory, and a third plurality of programming instructions stored in the memory and operating on the processor, wherein the third programming instructions, when operating on the processor, cause the processor to: interface with third party contact center services; and utilize these services in periods of on-premise callback system failure.

According to an aspect of an embodiment, the callback cloud is further configured to: monitor a call between a consumer and an agent for a loss of connection; wherein the loss of connection occurs create a callback object; and execute a callback between the consumer and the agent.

According to an aspect of an embodiment, the callback cloud is further configured to: receive a consumer transmission to a brand; determine an enterprise endpoint to route the consumer transmission; select an protocol associated with the enterprise endpoint; convert the consumer transmission to the selected protocol; and send the converted consumer transmission to the enterprise endpoint.

According to an aspect of an embodiment, the callback cloud is further configured to analyze the consumer transmission to determine a communication protocol associated with the consumer transmission.

According to an aspect of an embodiment, the consumer transmission is received via a telephone or voice over Internet protocol.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
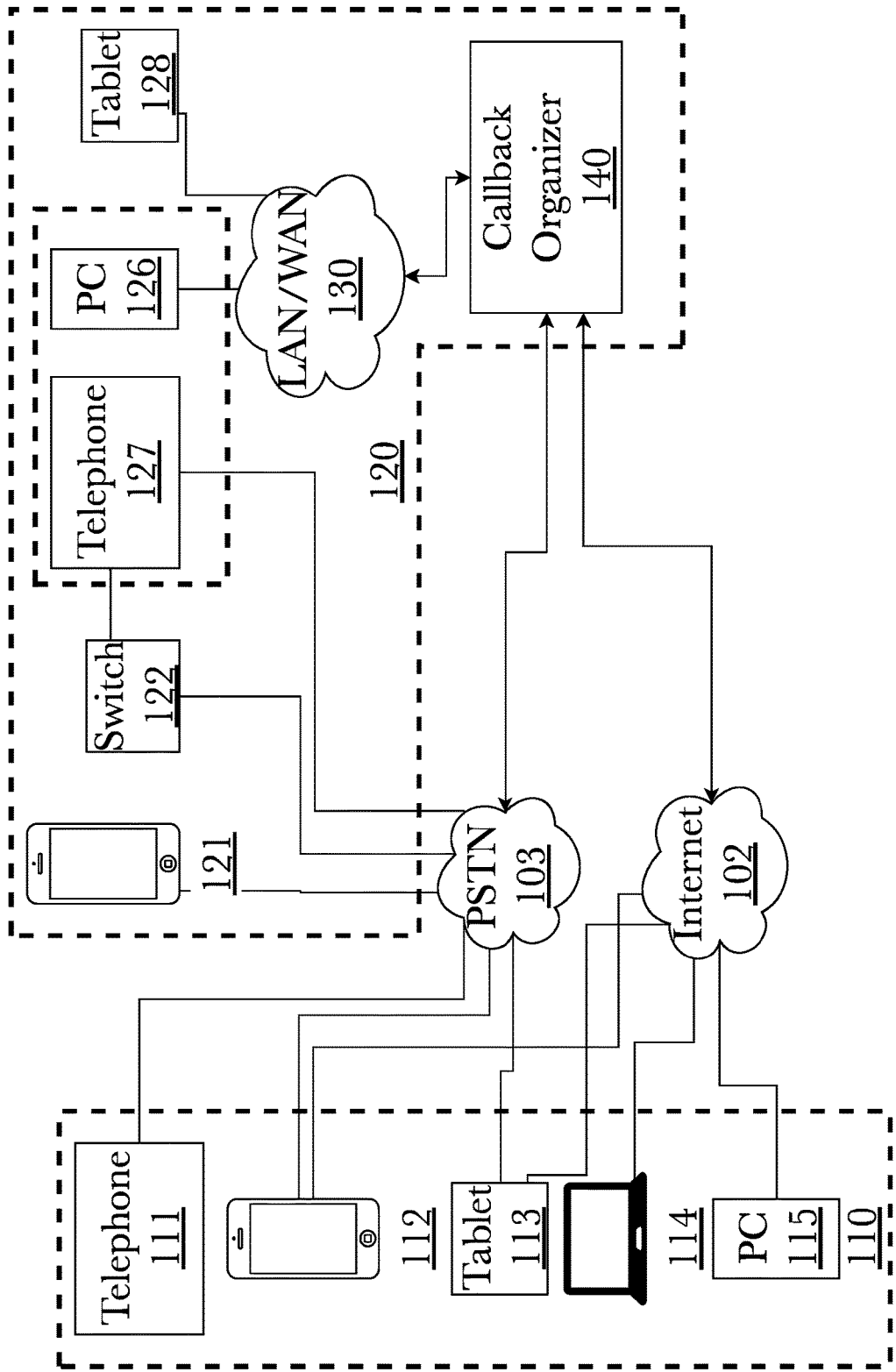
FIG. 1 (PRIOR ART) is a block diagram illustrating an on-premise callback system.

The inventor has conceived, and reduced to practice, a system and method for hybrid callback management.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Callback" as used herein refers to an instance of an individual being contacted after their initial contact was unsuccessful. For instance, if a first user calls a second user on a telephone, but the second user does not receive their call for one of numerous reasons including turning off their phone or simply not picking up, the second user may then place a callback to the first user once they realize they missed their call. This callback concept applies equally to many forms of interaction that need not be restricted to telephone calls, for example including (but not limited to) voice calls over a telephone line, video calls over a network connection, or live text-based chat such as web chat or short message service (SMS) texting. While a callback (and various associated components, methods, and operations taught herein) may also be used with an email communication despite the inherently asynchronous nature of email (participants may read and reply to emails at any time, and need not be interacting at the same time or while other participants are online or available), the preferred usage as taught herein refers to synchronous communication (that is, communication where participants are interacting at the same time, as with a phone call or chat conversation).

"Callback object" as used herein means a data object representing callback data, such as the identities and call information for a first and second user, the parameters for a callback including what time it shall be performed, and any other relevant data for a callback to be completed based on the data held by the callback object.

"Latency period" as used herein refers to the period of time between when a Callback Object is created and the desired Callback is initiated, for example, if a callback object is created and scheduled for a time five hours from the creation of the object, and the callback initiates on-time in five hours, the latency period is equal to the five hours between the callback object creation and the callback initiation.

"Brand" as used herein means a possible third-party service or device that may hold a specific identity, such as a specific MAC address, IP address, a username or secret key which can be sent to a cloud callback system for identification, or other manner of identifiable device or service that may connect with the system. Connected systems or services may include a Private Branch Exchange ("PBX"), call router, chat server which may include text or voice chat data, a Customer Relationship Management ("CRM") server, an Automatic Call Distributor ("ACD"), or a Session Initiation Protocol ("SIP") server.

Conceptual Architecture

FIG. 1 (PRIOR ART) is a block diagram illustrating an on-premise callback system. A possible plurality of consumer endpoints 110 may be connected to either a Public Switch Telephone Network ("PSTN") 103 or the Internet 102, further connecting them to an on-premise callback system 120. Such consumer endpoints may include a telephone 111 which connects over a PSTN, a mobile phone 112 capable of connecting over either a PSTN 103 or the Internet 102, a tablet capable of connecting over either a PSTN 103 or the Internet 102, or a laptop 114 or Personal Computer ("PC") 115 capable of connecting over the Internet 102. Connected to the Internet 102 is a callback organizer 140, which organizes callback data across internet 102 and PSTN 103 connections to consumer endpoints 110 and a local area network or wide area network 130 to further on-premise components. Other on-premise or inter-organizational endpoints may include agent cellular devices 121, an internal telephone switch 122 and telephone 127 which connect to the PSTN 103, a PC 126 or a tablet 128 that may be connected over a LAN or WAN 130. These brand endpoints in an on-premise callback system 120 may be involved in callbacks over the PSTN 103 or internet 102 connections, as organized by a callback organizer 140, which is responsible for all aspects of organizing callback requests including managing and calculating Estimated Wait-Times (EWT), managing agent schedule data, managing consumer queues and the agents logged into those queues, and other typical functions of an on-premise callback system.

Figure 2:
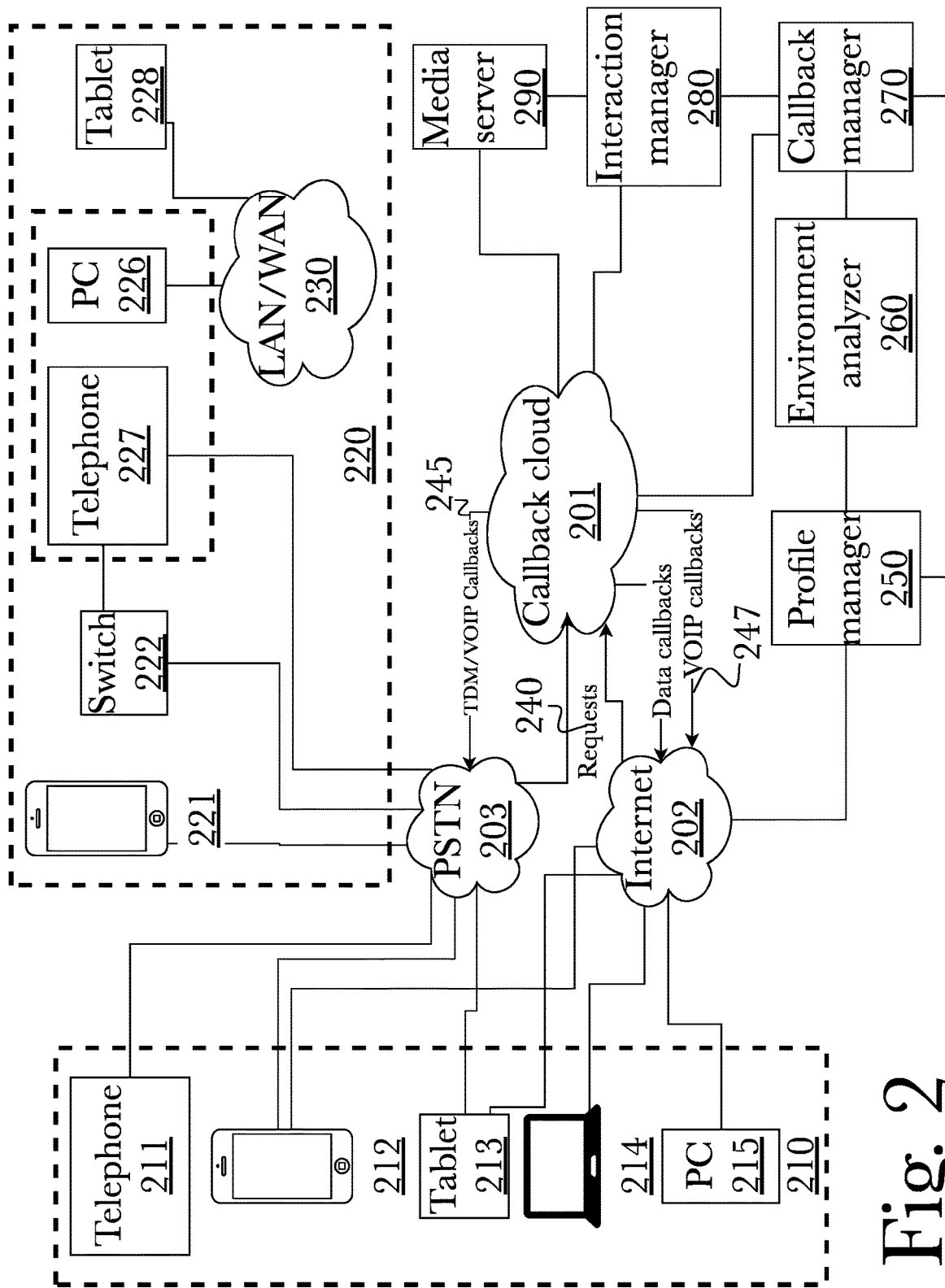
FIG. 2 is a block diagram illustrating an exemplary system architecture for operating a callback cloud, according to one aspect.

FIG. 2 is a block diagram of a preferred embodiment of the invention, illustrating an exemplary architecture of a system 200 for providing a callback cloud service. According to the embodiment, callback cloud 201 may receive requests 240 via a plurality of communications networks such as a public switched telephone network (PSTN) 203 or the Internet 202. These requests may comprise a variety of communication and interaction types, for example including (but not limited to) voice calls over a telephone line, video calls over a network connection, or live text-based chat such as web chat or short message service (SMS) texting via PSTN 203. Such communications networks may be connected to a plurality of consumer endpoints 210 and enterprise endpoints 220 as illustrated, according to the particular architecture of communication network involved. Exemplary consumer endpoints 210 may include, but are not limited to, traditional telephones 211, cellular telephones 212, mobile tablet computing devices 213, laptop computers 214, or desktop personal computers (PC) 215. Such devices may be connected to respective communications networks via a variety of means, which may include telephone dialers, VOIP telecommunications services, web browser applications, SMS text messaging services, or other telephony or data communications services. It will be appreciated by one having ordinary skill in the art that such means of communication are exemplary, and many alternative means are possible and becoming possible in the art, any of which may be utilized as an element of system 200 according to the invention.

A PSTN 203 or the Internet 202 (and it should be noted that not all alternate connections are shown for the sake of simplicity, for example a desktop PC 226 may communicate via the Internet 202) may be further connected to a plurality of enterprise endpoints 220, which may comprise cellular telephones 221, telephony switch 222, desktop environment 225, internal Local Area Network (LAN) or Wide-Area Network (WAN) 230, and mobile devices such as tablet computing device 228. As illustrated, desktop environment 225 may include both a telephone 227 and a desktop computer 226, which may be used as a network bridge to connect a telephony switch 222 to an internal LAN or WAN 230, such that additional mobile devices such as tablet PC 228 may utilize switch 222 to communicate with PSTN 202. Telephone 227 may be connected to switch 222 or it may be connected directly to PSTN 202. It will be appreciated that the illustrated arrangement is exemplary, and a variety of arrangements that may comprise additional devices known in the art are possible, according to the invention.

Callback cloud 201 may respond to requests 240 received from communications networks with callbacks appropriate to the technology utilized by such networks, such as data or Voice over Internet Protocol (VOIP) callbacks 245, 247 sent to Internet 202, or time-division multiplexing (TDM) such as is commonly used in cellular telephony networks such as the Global System for Mobile Communications (GSM) cellular network commonly used worldwide, or VOIP callbacks to PSTN 203. Data callbacks 247 may be performed over a variety of Internet-enabled communications technologies, such as via e-mail messages, application pop-ups, or Internet Relay Chat (IRC) conversations, and it will be appreciated by one having ordinary skill in the art that a wide variety of such communications technologies are available and may be utilized according to the invention. VOIP callbacks may be made using either, or both, traditional telephony networks such as PSTN 203 or over VOIP networks such as Internet 202, due to the flexibility to the technology involved and the design of such networks. It will be appreciated that such callback methods are exemplary, and that callbacks may be tailored to available communications technologies according to the invention.

Additionally, callback cloud 201 may receive estimated wait time (EWT) information from an enterprise 220 such as a contact center. This information may be used to estimate the wait time for a caller before reaching an agent (or other destination, such as an automated billing system), and determine whether to offer a callback proactively before the customer has waited for long. EWT information may also be used to select options for a callback being offered, for example to determine availability windows where a customer's callback is most likely to be fulfilled (based on anticipated agent availability at that time), or to offer the customer a callback from another department or location that may have different availability. This enables more detailed and relevant callback offerings by incorporating live performance data from an enterprise, and improves customer satisfaction by saving additional time with preselected recommendations and proactively-offered callbacks.

Figure 3:
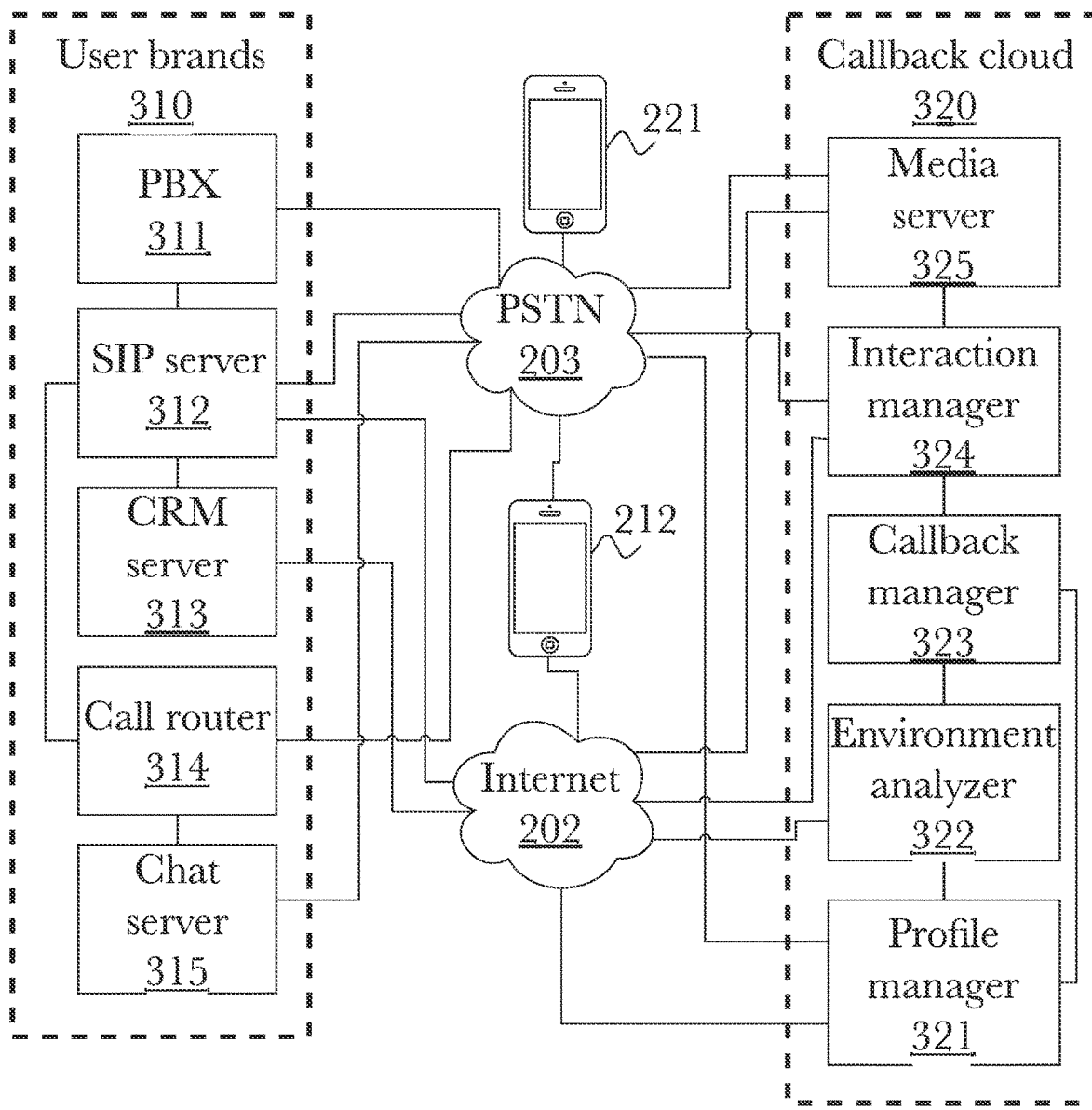
FIG. 3 is a block diagram illustrating an exemplary system architecture for a callback cloud operating over a public switched telephone network and internet, to a variety of other brand devices and services, according to an embodiment.

FIG. 3 is a block diagram illustrating an exemplary system architecture for a callback cloud operating over a public switched telephone network and the Internet, and connecting to a variety of other brand devices and services, according to an embodiment. A collection of user brands 310 may be present either singly or in some combination, possibly including a Public Branch Exchange ("PBX") 311, a Session Initiation Protocol ("SIP") server 312, a Customer Relationship Management ("CRM") server 313, a call router 314, or a chat server 315, or some combination of these brands. These brands 310 may communicate over a combination of, or only one of, a Public Switched Telephone Network ("PSTN") 203, and the Internet 202, to communicate with other devices including a callback cloud 320, a company phone 221, or a personal cellular phone 212. A SIP server 312 is responsible for initiating, maintaining, and terminating sessions of voice, video, and text or other messaging protocols, services, and applications, including handling of PBX 311 phone sessions, CRM server 313 user sessions, and calls forwarded via a call router 314, all of which may be used by a business to facilitate diverse communications requests from a user or users, reachable by phone 221, 212 over either PSTN 203 or the Internet 202. A chat server 315 may be responsible for maintaining one or both of text messaging with a user, and automated voice systems involving technologies such as an Automated Call Distributor ("ACD"), forwarding relevant data to a call router 314 and CRM server 313 for further processing, and a SIP server 312 for generating communications sessions not run over the PSTN 203. Various systems may also be used to monitor their respective interactions (for example, chat session by a chat server 315 or phone calls by an ACD or SIP server 312), to track agent and resource availability for producing EWT estimations.

When a user calls from a mobile device 212 or uses some communication application such as (for example, including but not limited to) SKYPE™ or instant messaging, which may also be available on a laptop or other network endpoint other than a cellular phone 212, they may be forwarded to brands 310 operated by a business in the manner described herein. For example, a cellular phone call my be placed over PSTN 203 before being handled by a call router 314 and generating a session with a SIP server 312, the SIP server creating a session with a callback cloud 320 with a profile manager 321 if the call cannot be completed, resulting in a callback being required. A profile manager 321 in a callback cloud 320 receives initial requests to connect to callback cloud 320, and forwards relevant user profile information to a callback manager 323, which may further request environmental context data from an environment analyzer 322. Environmental context data may include (for example, and not limited to) recorded information about when a callback requester or callback recipient may be suspected to be driving or commuting from work, for example, and may be parsed from online profiles or online textual data, using an environment analyzer 322.

A callback manager 323 centrally manages all callback data, creating a callback object which may be used to manage the data for a particular callback, and communicates with an interaction manager 324 which handles requests to make calls and bridge calls, which go out to a media server 325 which actually makes the calls as requested. In this way, the media server 325 may be altered in the manner in which it makes and bridges calls when directed, but the callback manager 323 does not need to adjust itself, due to going through an intermediary component, the interaction manager 324, as an interface between the two. A media server 325, when directed, may place calls and send messages, emails, or connect voice over IP ("VoIP") calls and video calls, to users over a PSTN 203 or the Internet 202. Callback manager 323 may work with a user's profile as managed by a profile manager 321, with environmental context from an environment analyzer 322 as well as (if provided) EWT information for any callback recipients (for example, contact center agents with the appropriate skills to address the callback requestor's needs, or online tech support agents to respond to chat requests), to determine an appropriate callback time for the two users (a callback requestor and a callback recipient), interfacing with an interaction manager 324 to physically place and bridge the calls with a media server 325. In this way, a user may communicate with another user on a PBX system 311, or with automated services hosted on a chat server 315, and if they do not successfully place their call or need to be called back by a system, a callback cloud 320 may find an optimal time to bridge a call between the callback requestor and callback recipient, as necessary.

Figure 4:
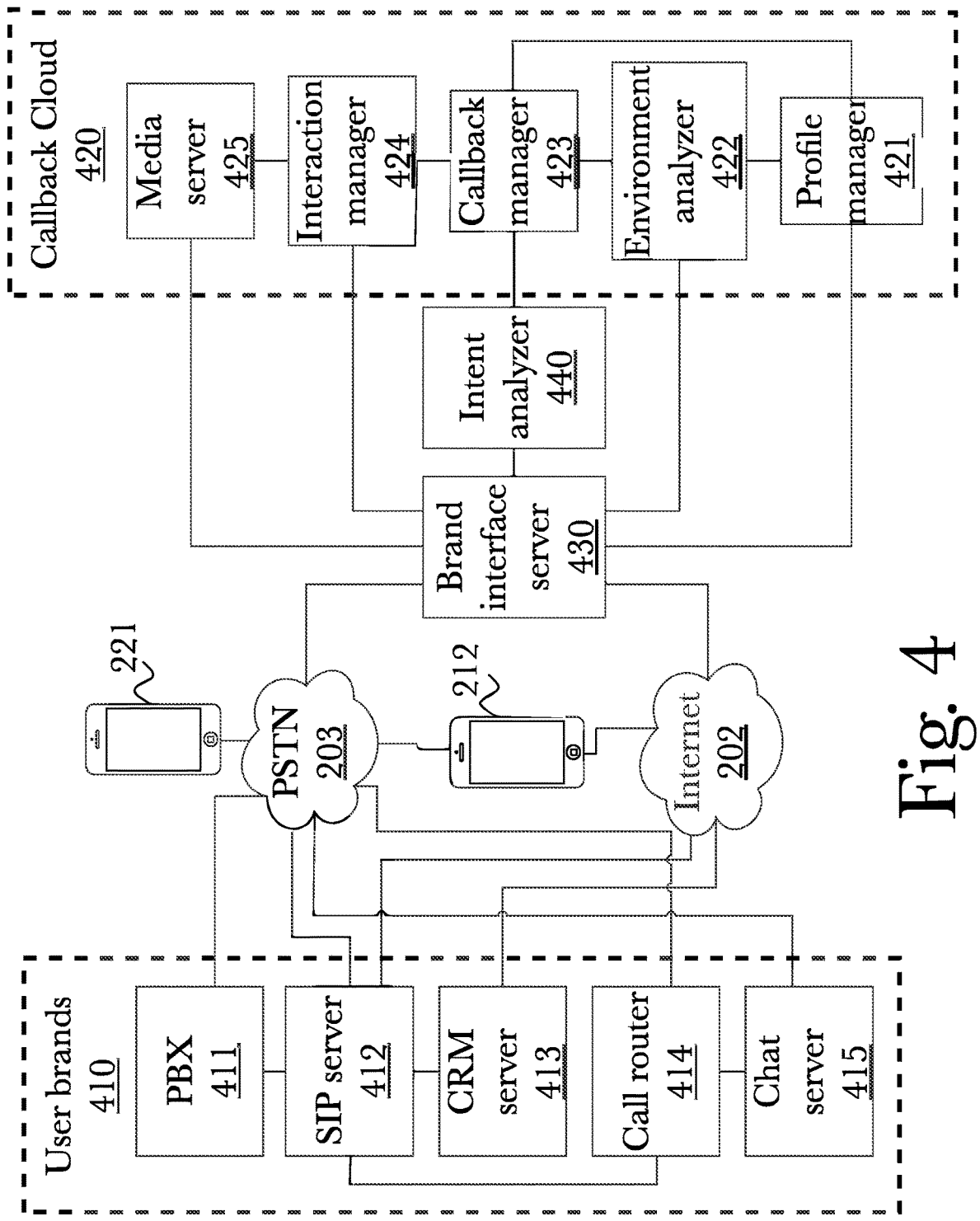
FIG. 4 is a block diagram illustrating an exemplary system architecture for a callback cloud operating including a brand interface server and intent analyzer, over a public switched telephone network and internet, to a variety of other brand devices and services, according to an embodiment.

FIG. 4 is a block diagram illustrating an exemplary system architecture for a callback cloud including a brand interface server and intent analyzer, operating over a public switched telephone network and the Internet, and connected to a variety of other brand devices and services, according to an embodiment. According to this embodiment, many user brands 410 are present, including PBX system 411, a SIP server 412, a CRM server 413, a call router 414, and a chat server 415, which may be connected variously to each other as shown, and connected to a PSTN 203 and the Internet 202, which further connect to a cellular phone 212 and a landline 221 or other phone that may not have internet access. Further shown is a callback cloud 420 contains multiple components, including a profile manager 421, environment analyzer 422, callback manager 423, interaction manager 424, and media server 425, which function as described in previous embodiments and, similarly to user brands 410 may be interconnected in various ways as depicted in the diagram, and connected to either a PSTN 203 or the internet 202.

Present in this embodiment is a brand interface server 430, which may expose the identity of, and any relevant API's or functionality for, any of a plurality of connected brands 410, to elements in a callback cloud 420. In this way, elements of a callback cloud 420 may be able to connect to, and interact more directly with, systems and applications operating in a business' infrastructure such as a SIP server 412, which may be interfaced with a profile manager 421 to determine the exact nature of a user's profiles, sessions, and interactions in the system for added precision regarding their possible availability and most importantly, their identity. Also present in this embodiment is an intent analyzer 440, which analyzes spoken words or typed messages from a user that initiated the callback request, to determine their intent for a callback. For example, their intent may be to have an hour-long meeting, which may factor into the decision by a callback cloud 420 to place a call shortly before one or both users may be required to start commuting to or from their workplace. Intent analysis may utilize any combination of text analytics, speech-to-text transcription, audio analysis, facial recognition, expression analysis, posture analysis, or other analysis techniques, and the particular technique or combination of techniques may vary according to such factors as the device type or interaction type (for example, speech-to-text may be used for a voice-only call, while face/expression/posture analysis may be appropriate for a video call), or according to preconfigured settings (that may be global, enterprise-specific, user-specific, device-specific, or any other defined scope).

Figure 5:
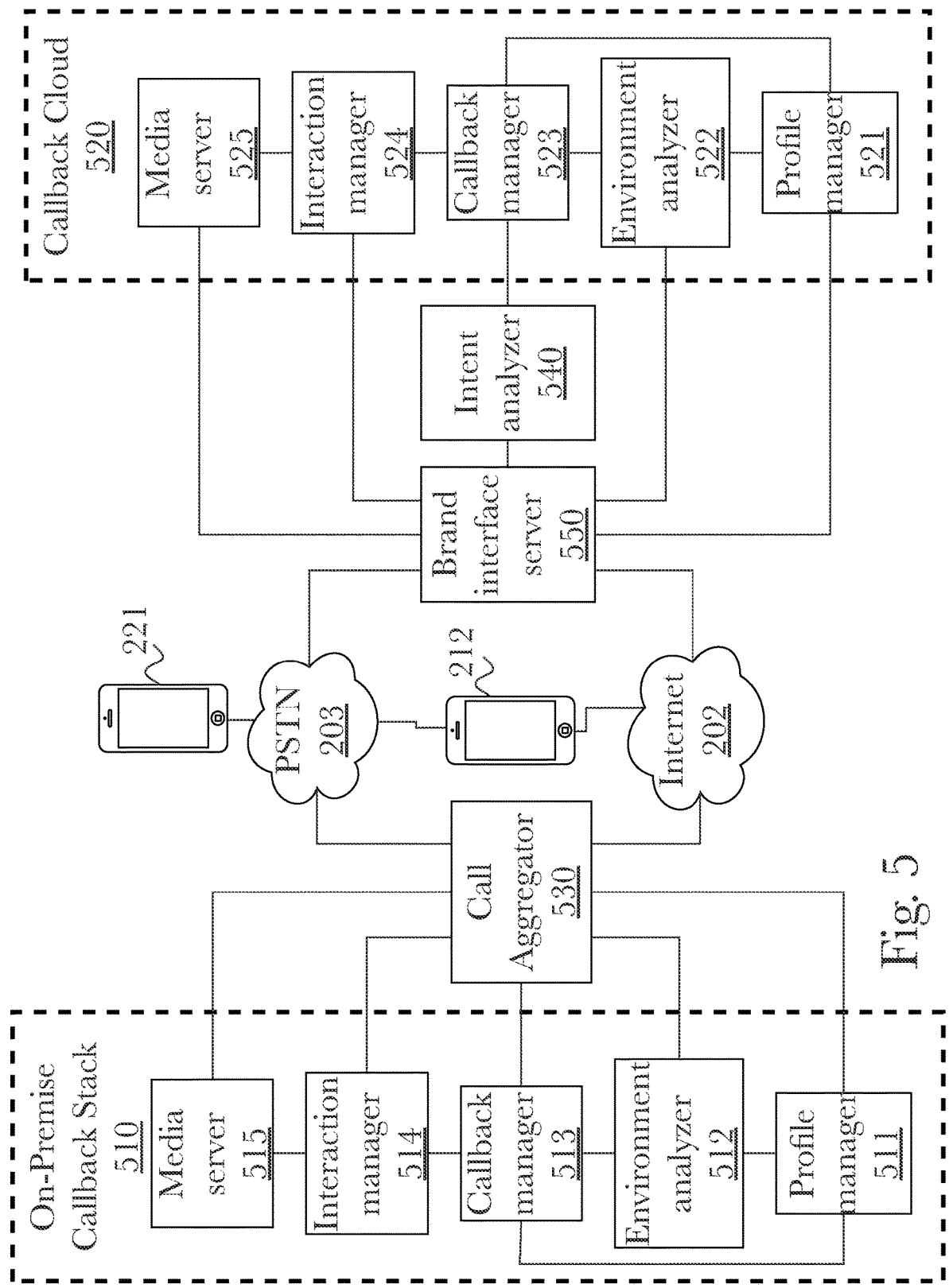
FIG. 5 is a block diagram illustrating an exemplary system architecture for a hybrid callback system operating with a callback cloud and an on-premise callback stack, according to an embodiment.

FIG. 5 is a block diagram illustrating an exemplary system architecture for a hybrid callback system operating with a callback cloud and an on-premise callback stack, according to an embodiment. According to this embodiment, an on-premise callback stack 510 is shown, which contains multiple components, including a profile manager 511, environment analyzer 512, callback manager 513, interaction manager 514, and media server 515, which are interconnected in various ways as depicted in the diagram, and connected to a call aggregator 530 which aggregates user calls into queues using data received from an on-premise callback stack 510, and allowing these aggregated and queued calls to then be managed by a callback manager 513. A call aggregator may be connected to either of a PSTN 203 or the internet 202, or it may be connected to both and receive call data from both networks as needed. Further shown is a callback cloud 520 which contains multiple similar components, including a profile manager 521, environment analyzer 522, callback manager 523, interaction manager 524, and media server 525, which function as described in previous embodiments and, similarly to an on-premise callback stack 510 may be interconnected in various ways as depicted in the diagram, and connected to either a PSTN 203 or the internet 202.

Present in this embodiment is a brand interface server 550, which may expose the identity of, and any relevant API's or functionality for, any of a plurality of connected brands or on-premise callback components 510 which may be responsible for operating related brands, to elements in a callback cloud 520. In this way, elements of a callback cloud 520 may be able to connect to, and interact more directly with, systems and applications operating in a business' infrastructure such as a SIP server, which may be interfaced with a profile manager 521 to determine the exact nature of a user's profiles, sessions, and interactions in the system for added precision regarding their possible availability and most importantly, their identity. Also present in this embodiment is an intent analyzer 540, which analyzes spoken words or typed messages from a user that initiated the callback request, to determine their intent for a callback. For example, their intent may be to have an hour-long meeting, which may factor into the decision by a callback cloud 520 to place a call shortly before one or both users may be required to start commuting to or from their workplace. Intent analysis may utilize any combination of text analytics, speech-to-text transcription, audio analysis, facial recognition, expression analysis, posture analysis, or other analysis techniques, and the particular technique or combination of techniques may vary according to such factors as the device type or interaction type (for example, speech-to-text may be used for a voice-only call, while face/expression/posture analysis may be appropriate for a video call), or according to preconfigured settings (that may be global, enterprise-specific, user-specific, device-specific, or any other defined scope).

Figure 6:
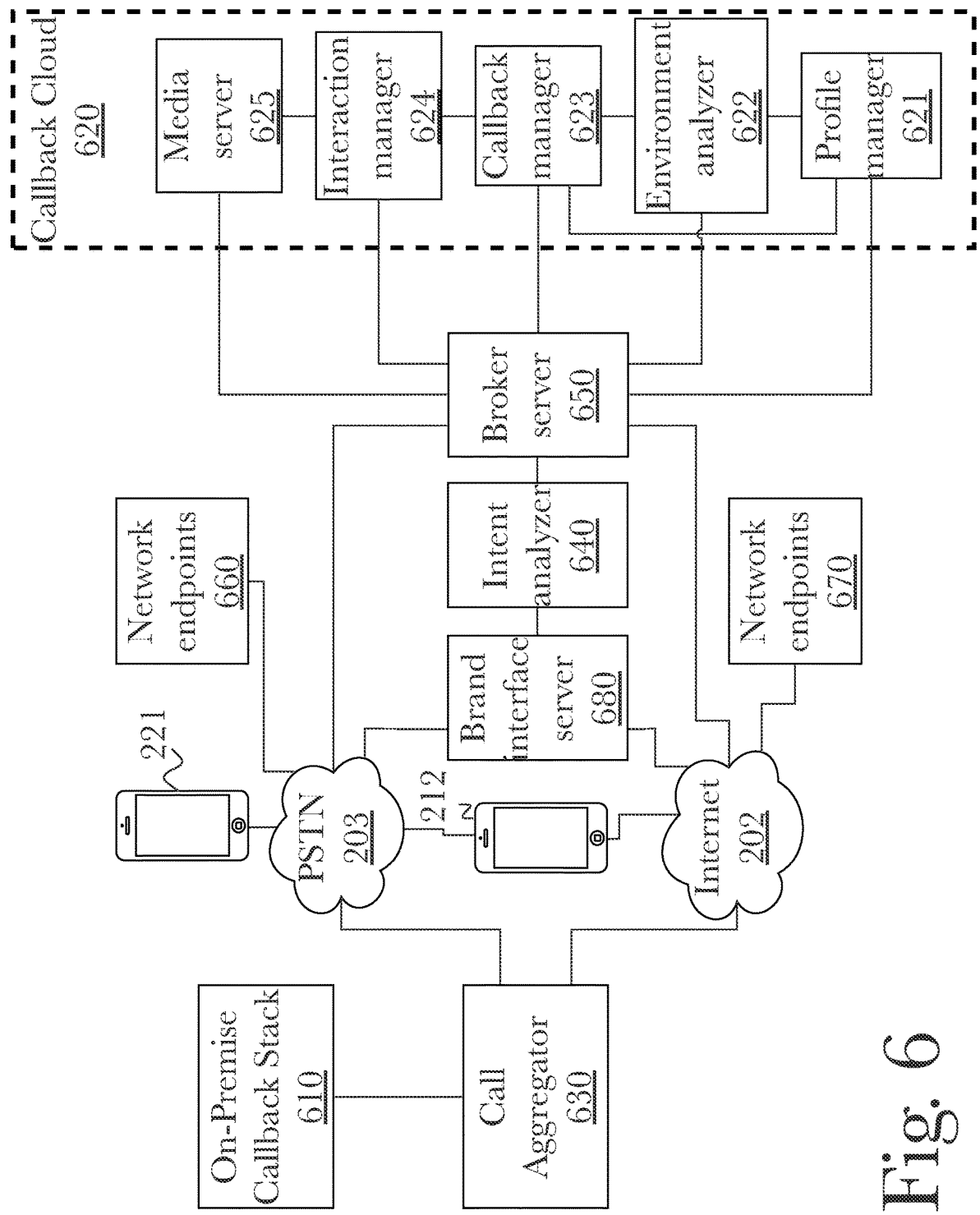
FIG. 6 is a block diagram illustrating an exemplary system architecture for a hybrid callback system operating with a callback cloud and an on-premise callback stack, and a broker server, according to an embodiment.

FIG. 6 is a block diagram illustrating an exemplary system architecture for a hybrid callback system operating with a callback cloud and an on-premise callback stack, and a broker server, according to an embodiment. According to this embodiment, an on-premise callback stack 610 is shown, which connects to a call aggregator 630 which aggregates user calls into queues using data received from an on-premise callback stack 610, and allowing these aggregated and queued calls to then be managed by a callback manager 613. The features and connections of the on-premise callback stack 610 are similar to that shown in FIG. 5, 510. A call aggregator may be connected to either of a PSTN 203 or the internet 202, or it may be connected to both and receive call data from both networks as needed. Further shown is a callback cloud 620 which contains multiple components, including a profile manager 621, environment analyzer 622, callback manager 623, interaction manager 624, and media server 625, which function as described in previous embodiments and, similarly to an on-premise callback stack 610 may be interconnected in various ways as depicted in the diagram, and connected to either a PSTN 203 or the internet 202. A plurality of network endpoints 660, 670 may be connected to either or both of the PTSN 203 and the Internet 202, the network endpoints may include, but are not limited to, traditional telephones, cellular telephones, mobile tablet computing devices, laptop computers, or desktop personal computers (PC).

Present in this embodiment is a brand interface server 680, which may expose the identity of, and any relevant API's or functionality for, any of a plurality of connected brands or on-premise callback components 610 which may be responsible for operating related brands, to elements in a callback cloud 620, through the use of an intent analyzer 640 and a broker server 650 to act as an intermediary between a callback cloud 620 and the plurality of other systems or services. In this way, elements of a callback cloud 620 may be able to connect to a broker server 650, and interact more indirectly with systems and applications operating in a business' infrastructure such as a SIP server, which may communicate with a profile manager 621 to determine the exact nature of a user's profiles, sessions, and interactions in the system for added precision regarding their possible availability and most importantly, their identity. A broker server 650 operates as an intermediary between the services and systems of a callback cloud 620 and other external systems or services, such as an intent analyzer 640, PSTN 203, or the Internet 202. Also present in this embodiment is an intent analyzer 640, which analyzes spoken words or typed messages from a user that initiated the callback request, to determine their intent for a callback. For example, their intent may be to have an hour-long meeting, which may factor into the decision by a callback cloud 620 to place a call shortly before one or both users may be required to start commuting to or from their workplace. Intent analysis may utilize any combination of text analytics, speech-to-text transcription, audio analysis, facial recognition, expression analysis, posture analysis, or other analysis techniques, and the particular technique or combination of techniques may vary according to such factors as the device type or interaction type (for example, speech-to-text may be used for a voice-only call, while face/expression/posture analysis may be appropriate for a video call), or according to preconfigured settings (that may be global, enterprise-specific, user-specific, device-specific, or any other defined scope).

Figure 7:
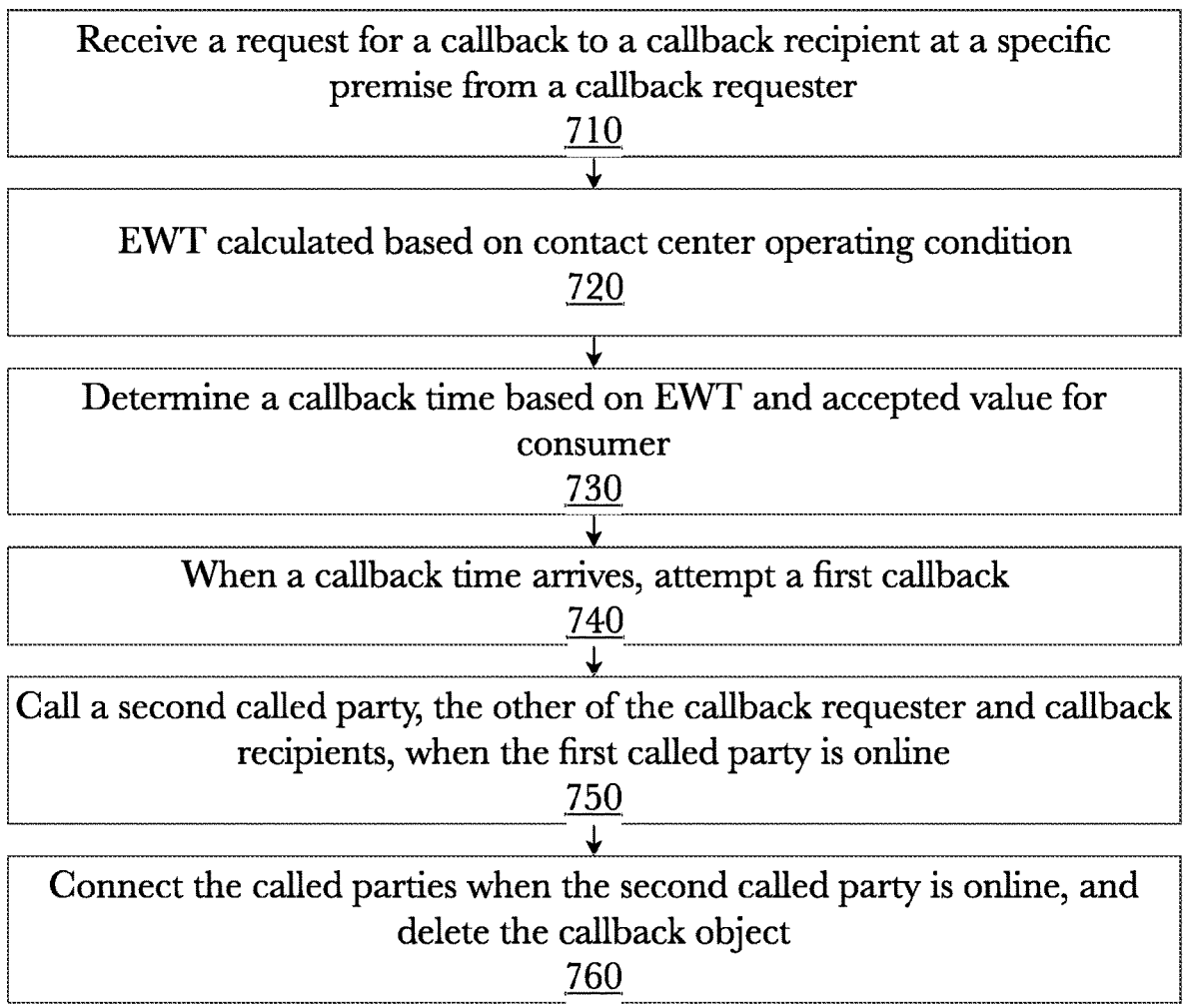
FIG. 7 (PRIOR ART) is a method diagram illustrating steps in the operation of an on-premise callback system.

FIG. 7 (PRIOR ART) is a method diagram illustrating steps in the operation of an on-premise callback system. A consumer may initiate a callback request to a brand handled or managed at a premise 710, such as if a consumer were to place a phone call to customer service for a corporation and the contact center or centers were unable to immediately answer their call. An estimated wait time (EWT) is calculated for consumers in the queue based on the condition of the contact center 720, determining a possible callback time based on the EWT and a consumer-accepted time 730, such as calling a consumer back in 10 minutes when an agent at the premise is available and their spot in the queue is reached 740. Regardless of the specific time chosen, a first callback is attempted 740 when the selected time is reached, calling a first party of either the brand agent or the consumer, followed by calling of the second party if and when the first party comes online 750. When both parties are online they are connected together such as bridging the two phones to a single call 760, and any callback object used to manage the callback data is deleted after the successful callback.

Figure 8:
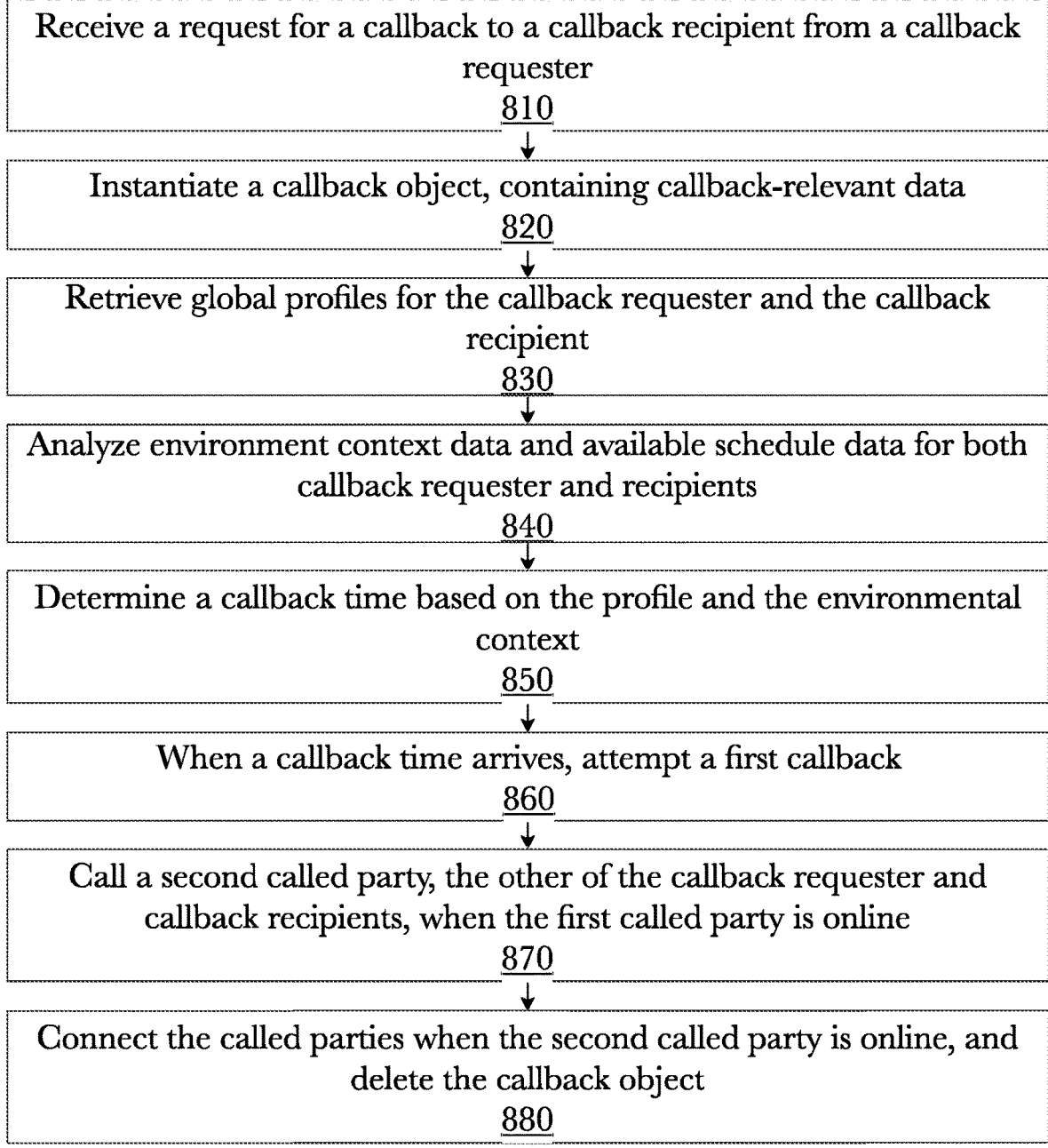
FIG. 8 is a method diagram illustrating the use of a callback cloud for intent-based active callback management, according to an embodiment.

FIG. 8 is a method diagram illustrating the use of a callback cloud for intent-based active callback management, according to an embodiment. According to an embodiment, a callback cloud 320 must receive a request for a callback to a callback recipient, from a callback requester 810. This refers to an individual calling a user of a cloud callback system 320, being unable to connect for any reason, and the system allowing the caller to request a callback, thus becoming the callback requester, from the callback recipient, the person they were initially unable to reach. A callback object is instantiated 820, using a callback manager 323, which is an object with data fields representing the various parts of callback data for a callback requester and callback recipient, and any related information such as what scheduled times may be possible for such a callback to take place. Global profiles may then be retrieved 830 using a profile manager 321 in a cloud callback system, as well as an analysis of environmental context data 840, allowing for the system to determine times when a callback may be possible for a callback requestor and callback recipient both 850. When such a time arrives, a first callback is attempted 860 to the callback requestor or callback recipient, and if this succeeds, a second call is attempted to the second of the callback requestor and callback recipient 870, allowing a media server 325 to bridge the connection when both are online, before deleting the callback object 880.

Figure 9:
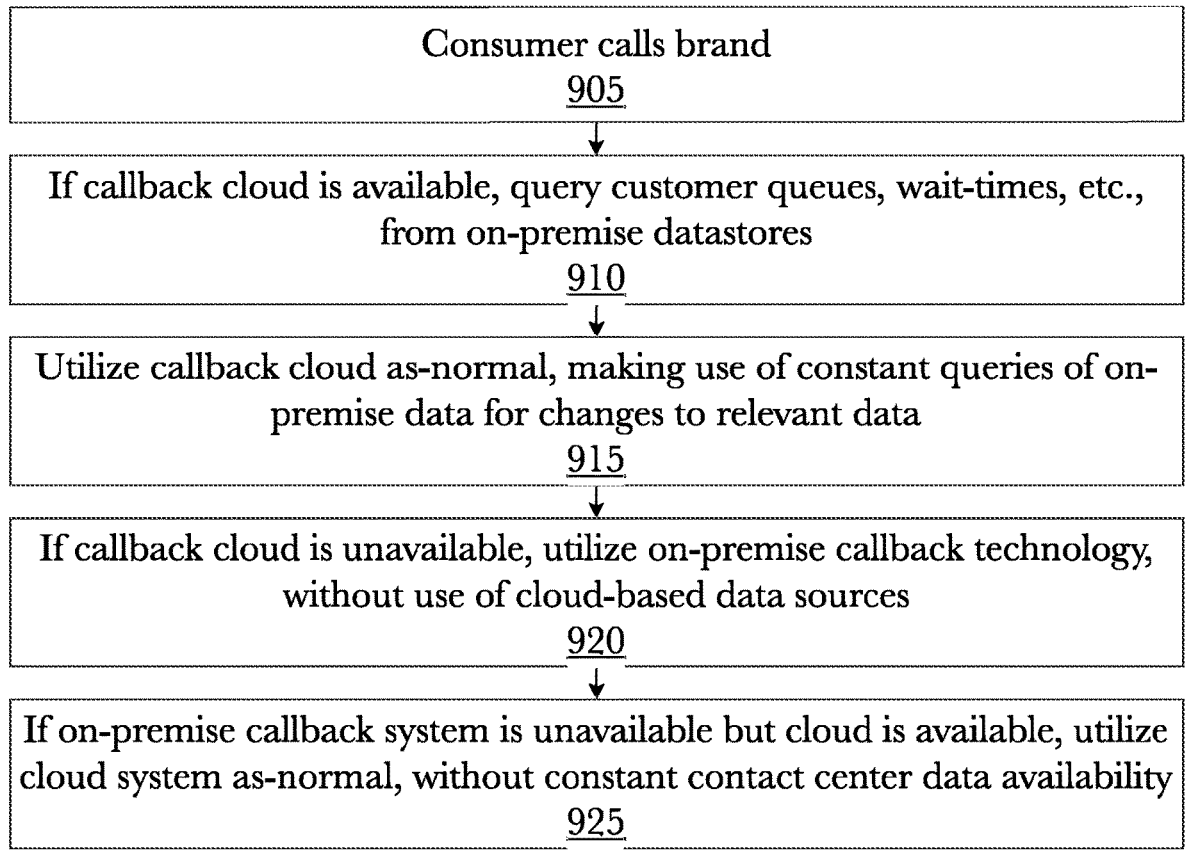
FIG. 9 is a method diagram illustrating the operation of a distributed hybrid callback system architecture utilizing cloud services and on-premise services, according to an embodiment.

FIG. 9 is a method diagram illustrating the operation of a distributed hybrid callback system architecture utilizing cloud services and on-premise services, according to an embodiment. First, a consumer places a call to a brand 905, resulting in on-premise datastores and services being queried by a callback cloud if such a callback cloud is properly configured and online 910. A callback cloud may be utilized normally to manage consumer queues, calculate EWT's, manage agent statuses and their call lengths and queue membership, and other common callback system functions, with the querying of on-premise datastores and services 915. If a callback cloud is unavailable however, an on-premise callback system may be utilized as described in prior art figures, without use of cloud services 920. If a cloud callback system is available and configured, but on-premise callback services are unavailable, a cloud callback system can utilize last-known data such as last-known EWT's and manage consumer callbacks as normal without being able to query new data from on-premise datastores 925, potentially resulting in slightly less consistent or optimal callback handling initially, but still maintaining the system.

Figure 10:
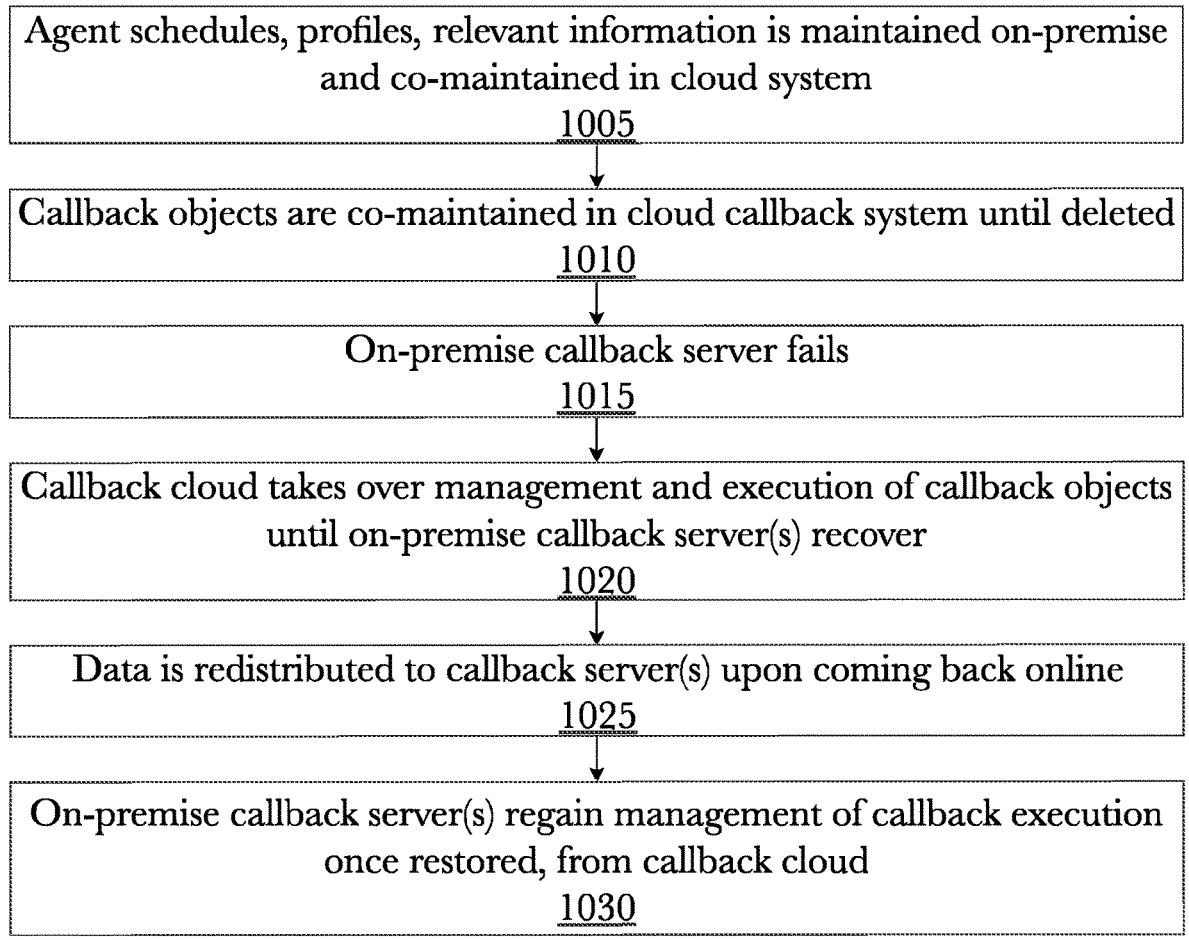
FIG. 10 is a method diagram illustrating the use of callback cloud services to aid in the recovery of an on-premise callback system in the event of a premise callback server failure.

FIG. 10 is a method diagram illustrating the use of callback cloud services to aid in the recovery of an on-premise callback system in the event of a premise callback server failure. Agent data such as schedules and their profiles regarding average call duration are stored on-premise and co-maintained in a cloud callback system 1005. Also co-maintained between a callback cloud and on-premise callback system are callback objects, which hold data regarding a particular callback request including the requester, the time to attempt the callback, and any information regarding the brand or specific agent to perform the callback, if applicable 1010. Should an on-premise callback server fail 1015, a callback cloud may take over management and execution of callback objects until said on-premise callback server recovers 1020, essentially behaving as the new callback system for the contact center. Should a contact center's callback server come back online, data is re-distributed to it from the callback cloud system 1025, with the on-premise server regaining management and execution of callback objects from the callback cloud 1030.

Figure 11:
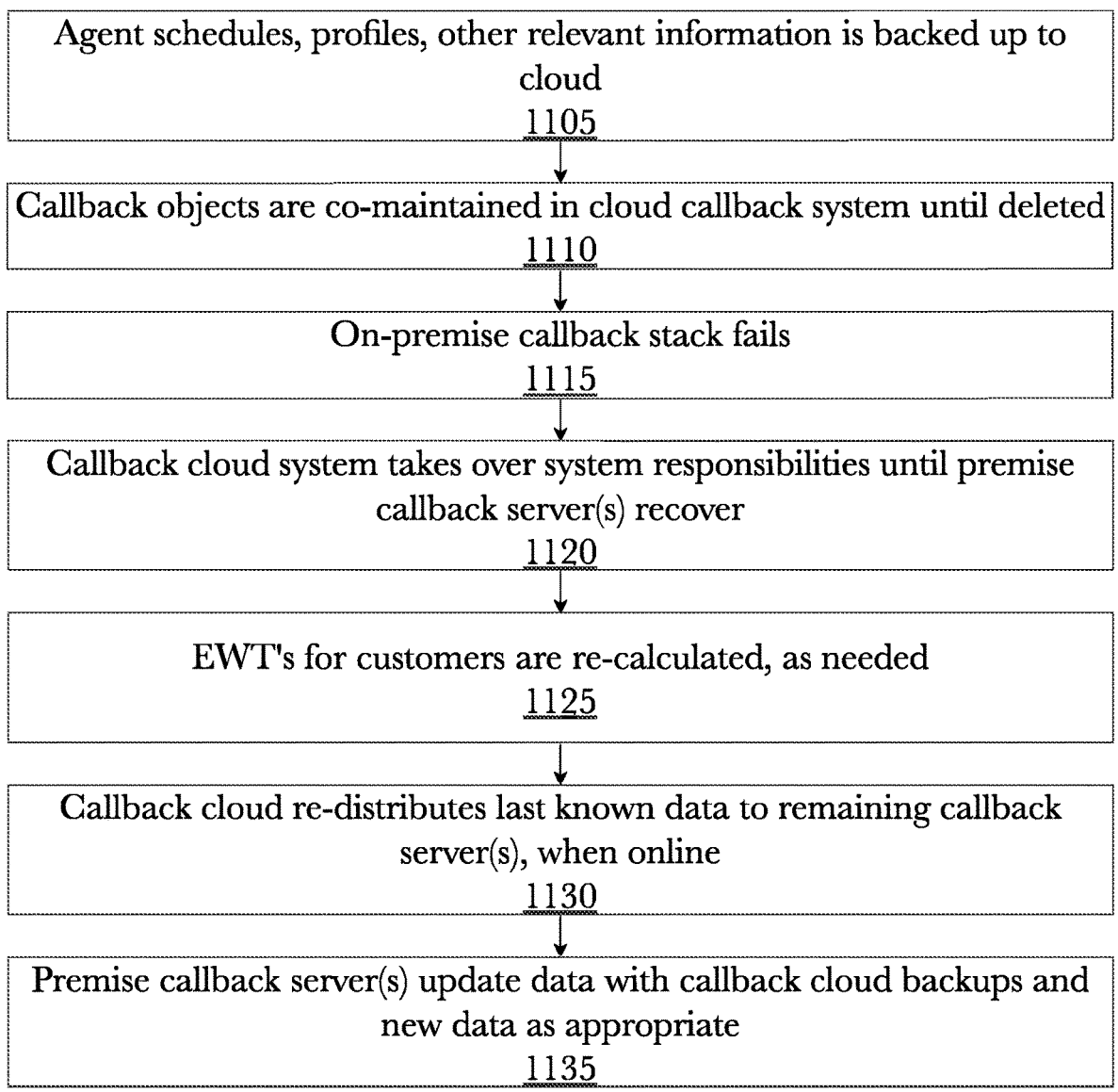
FIG. 11 is a method diagram illustrating the use of callback cloud services to aid in the recovery of an on-premise callback system in the event of a total system failure.

FIG. 11 is a method diagram illustrating the use of callback cloud services to aid in the recovery of an on-premise callback system in the event of a total system failure. Agent data such as schedules and their profiles regarding average call duration are stored on-premise and co-maintained in a cloud callback system 1105. Also co-maintained between a callback cloud and on-premise callback system are callback objects, which hold data regarding a particular callback request including the requester, the time to attempt the callback, and any information regarding the brand or specific agent to perform the callback, if applicable 1110. Should an entire on-premise callback stack fail 1115, a callback cloud may take over management and execution of all callback-related activities including callback execution, EWT calculation 1125, and more 1120, until said on-premise callback stack recovers 1130, essentially behaving as the new callback system for the contact center. Should a contact center's callback stack come back online, data is re-distributed to it from the callback cloud system 1130, with the on-premise server regaining management of callback systems and updating their data from the callback cloud's data as appropriate 1135.

Figure 12:
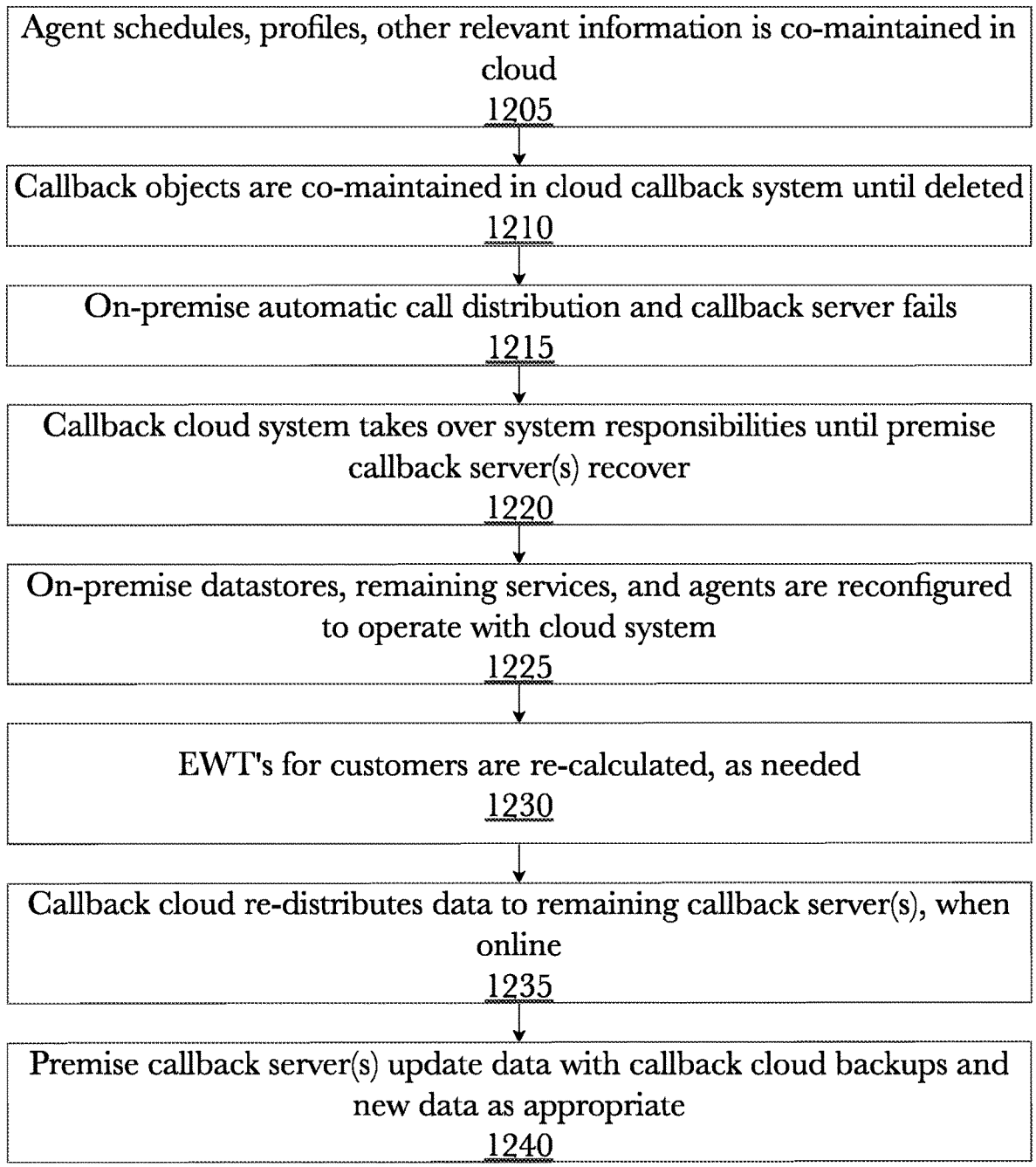
FIG. 12 is a method diagram illustrating the use of callback cloud services to aid in the recovery of an on-premise callback system in the event of a premise automatic call distribution and callback server failure.

FIG. 12 is a method diagram illustrating the use of callback cloud services to aid in the recovery of an on-premise callback system in the event of a premise automatic call distribution and callback server failure. Agent data such as schedules and their profiles regarding average call duration are stored on-premise and co-maintained in a cloud callback system 1205. Also co-maintained between a callback cloud and on-premise callback system are callback objects, which hold data regarding a particular callback request including the requester, the time to attempt the callback, and any information regarding the brand or specific agent to perform the callback, if applicable 1210. Should an on-premise Automatic Call Distribution (ACD) system and callback server fail 1215, a callback cloud may take over management and execution of call distribution and callback-related activities as necessary 1220, with on-site agents interfacing with cloud services for example through a web-browser 1225 and with remaining on-site resources being made available to the cloud infrastructure as needed such as for the purposes of recalculating consumer EWT's 1230, until the on-premise callback stack recovers, essentially behaving as the new callback system for the contact center. Should a contact center's callback stack come back online, data is re-distributed to it from the callback cloud system 1235, with the on-premise server regaining management of callback systems and updating their data from the callback cloud's data as appropriate 1240.

Figure 13:
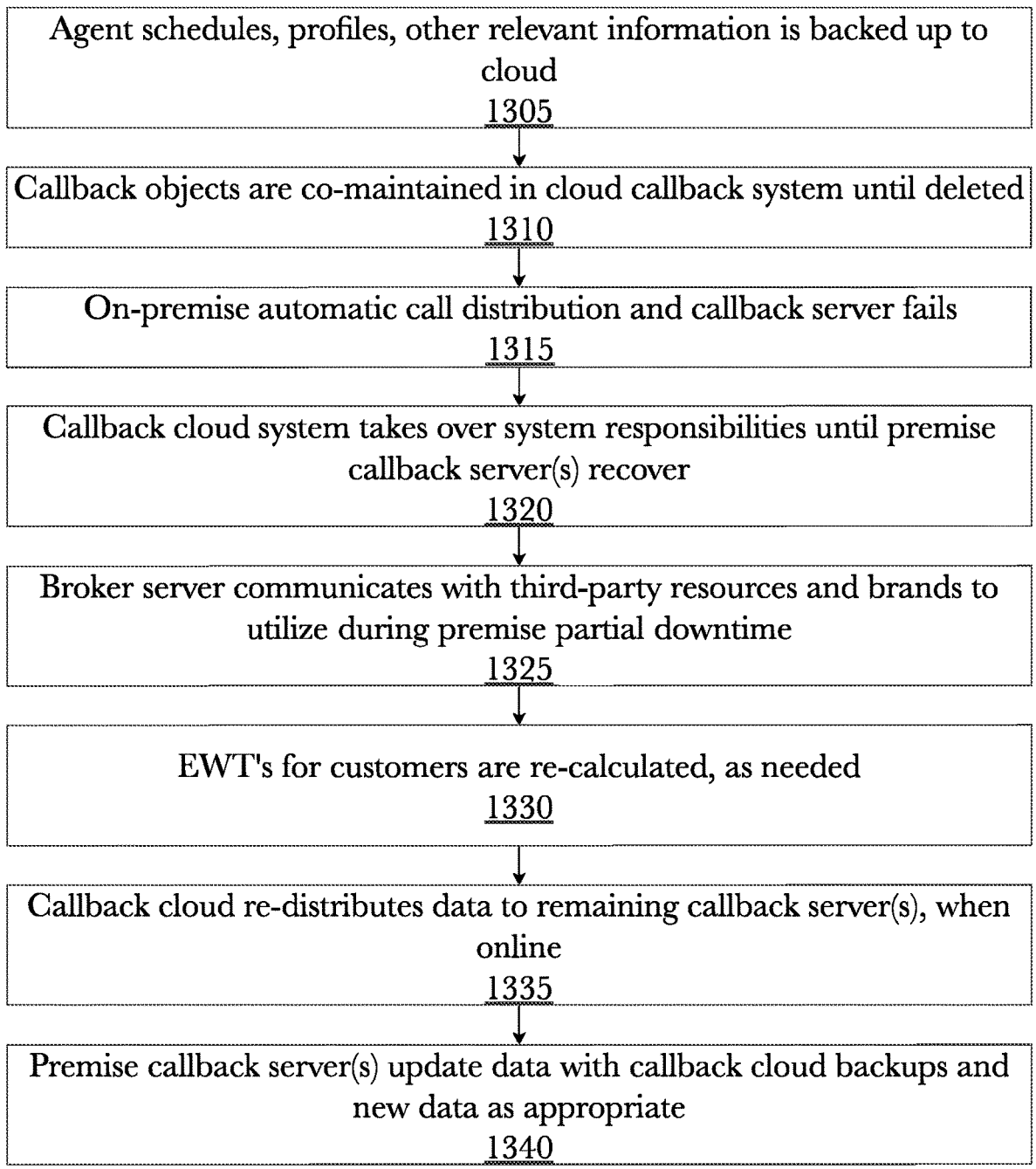
FIG. 13 is a method diagram illustrating the use of callback cloud services to aid in the recovery of an on-premise callback system in the event of a partial system failure, using a broker server to leverage third-party resources for failure recovery.

FIG. 13 is a method diagram illustrating the use of callback cloud services to aid in the recovery of an on-premise callback system in the event of a partial system failure, using a broker server to leverage third-party resources for failure recovery. Agent data such as schedules and their profiles regarding average call duration are stored on-premise and co-maintained in a cloud callback system 1305. Also co-maintained between a callback cloud and on-premise callback system are callback objects, which hold data regarding a particular callback request including the requester, the time to attempt the callback, and any information regarding the brand or specific agent to perform the callback, if applicable 1310. Should an on-premise Automatic Call Distribution (ACD) system and callback server fail 1315, a callback cloud may take over management and execution of call distribution and callback-related activities as necessary 1320, with a broker server interfacing with third-party services such as other contact centers to leverage other resources to manage the load during the premise downtime 1325. Consumer EWT is recalculated if needed 1330, and should a contact center's callback stack come back online, data is re-distributed to it from the callback cloud system 1335, with the on-premise server regaining management of callback systems and updating their data from the callback cloud's data as appropriate 1340.

Figure 14:
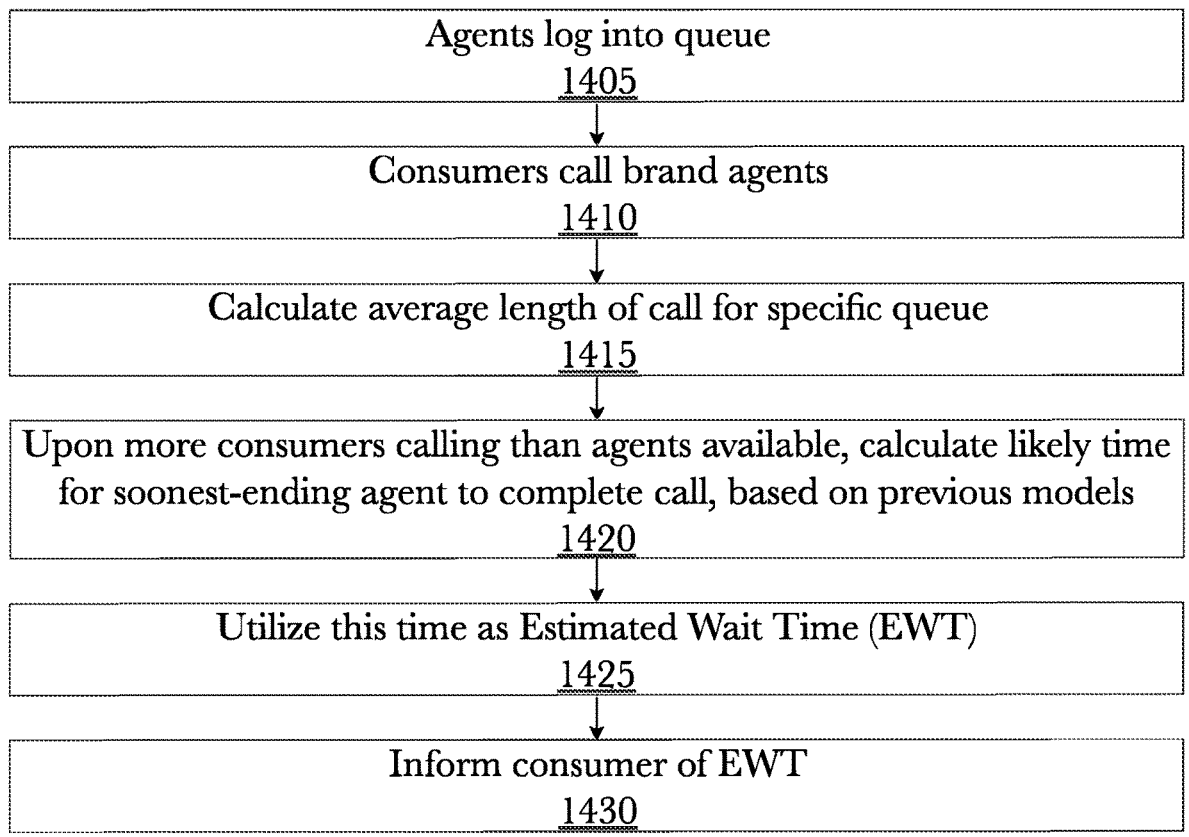
FIG. 14 is a method diagram illustrating calculation and recalculation of an estimated wait-time (EWT) for a distributed callback system.

FIG. 14 is a method diagram illustrating calculation and recalculation of an estimated wait-time (EWT) for a distributed callback system. An agent may log into a queue or be assigned automatically to a queue by a callback manager or call aggregator 1405, allowing consumers to call or open communications with a brand's agents 1410. An average call length for each queue is calculated 1415 utilizing branching averages, for example most calls may be calculated to take 4 minutes, but a call that has already progressed to 3 minutes may be calculated to have a 70% chance of reaching at least 5 minutes in length. Upon more consumers than agents becoming available, or any change in the amount of available agents or consumers in the queue, calculate the time based on these averages that the next available agent will be free to engage in a call with the consumer 1420. This is utilized as the Estimated Wait Time (EWT) for a consumer 1425, and a consumer may be informed of the EWT for callback purposes 1430.

Figure 15:
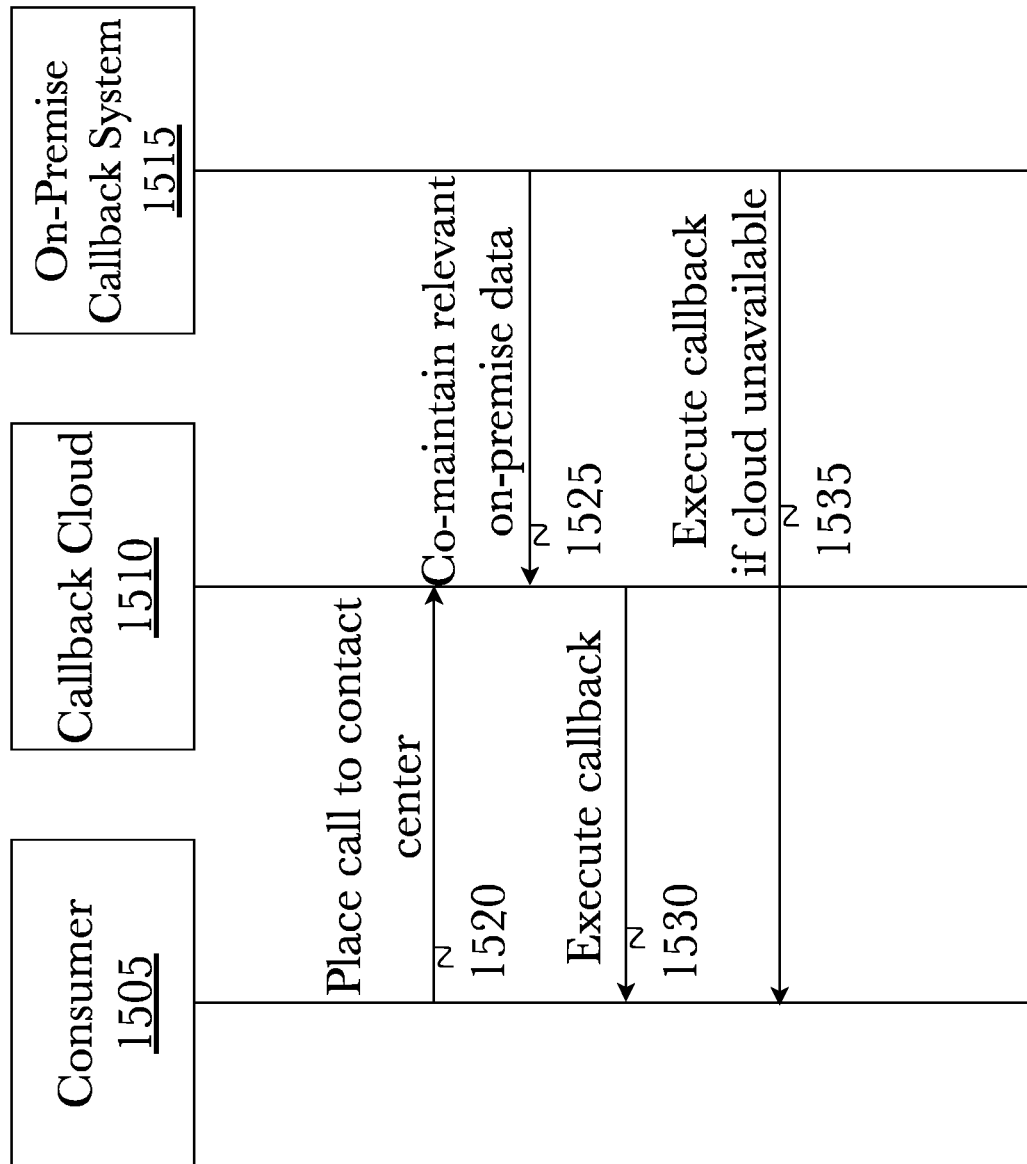
FIG. 15 is a message flow diagram illustrating the operation of a distributed hybrid callback system architecture utilizing cloud services and on-premise services, according to an embodiment.

FIG. 15 is a message flow diagram illustrating the operation of a distributed hybrid callback system architecture utilizing cloud services and on-premise services, according to an embodiment. A consumer 1505, callback cloud 1510, and on-premise callback system 1515 are the principle actors in data transmissions, with specific components of a callback cloud 1510 or on-premise callback system 1515 handling data internally to the respective systems, and a consumer 1505 potentially using one of many common endpoints such as a cellphone, landline phone, PC, tablet, or laptop. A consumer 1505 may place a call from one such endpoint, to a contact center 1520, which may be received by a callback cloud 1510 that is online and managing callback data for a given premise callback system 1515. An on-premise callback system 1515 may co-maintain data including average call times for certain queues, agent availability, agent schedules, and more, with a callback cloud 1525, allowing a callback cloud to execute a callback 1530 to a consumer 1505, connecting agents and consumers with said callbacks as necessary. If a callback cloud is unavailable, an on-premise callback system instead executes the callback 1535, the callback object being used to attempt to open communications with the consumer 1505 and an on-premise agent.

Figure 16:
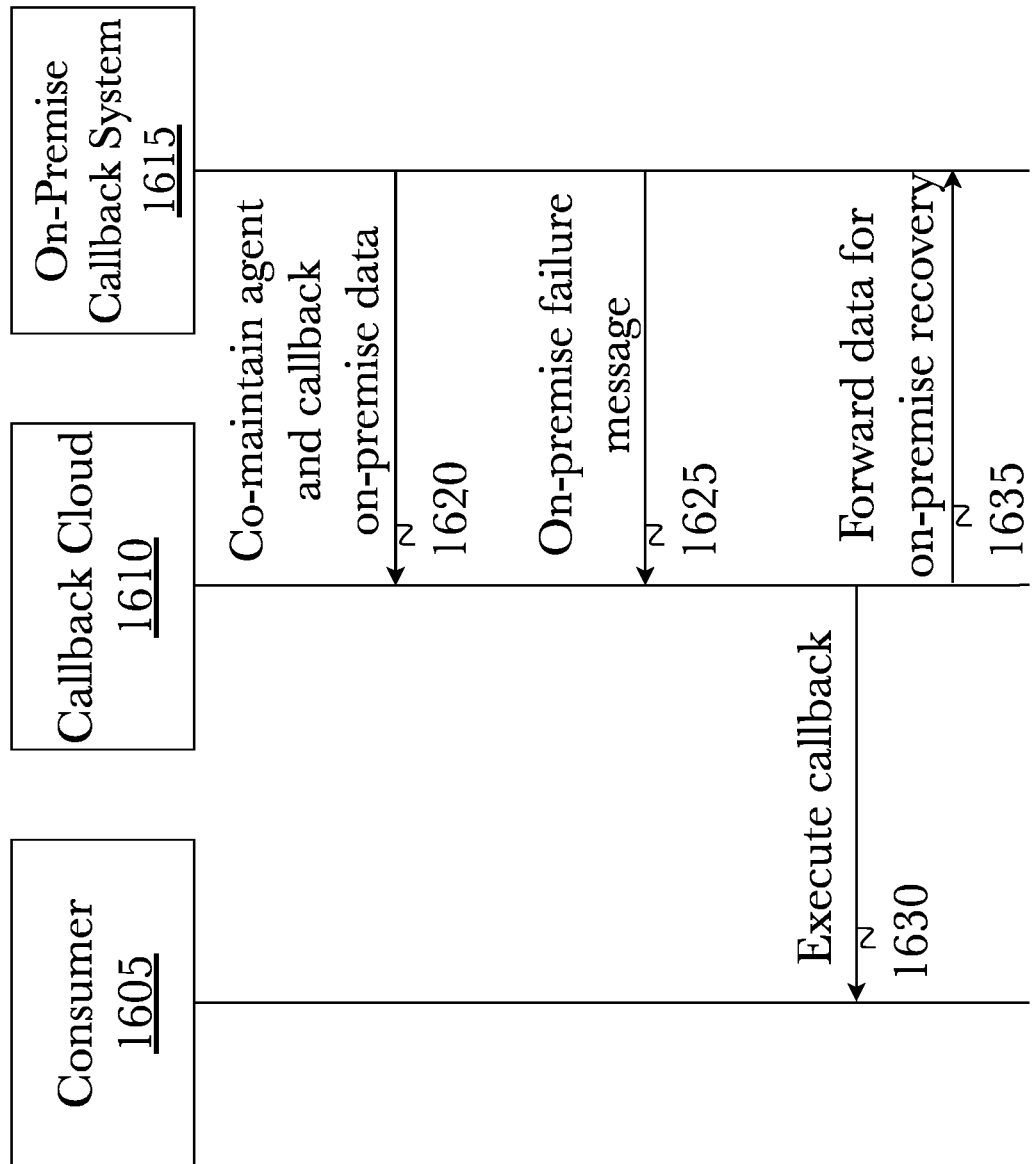
FIG. 16 is a message flow diagram illustrating the use of callback cloud services to aid in the recovery of an on-premise callback system in the event of a premise callback server failure.

FIG. 16 is a message flow diagram illustrating the use of callback cloud services to aid in the recovery of an on-premise callback system in the event of a premise callback server failure. A consumer 1605, callback cloud 1610, and on-premise callback system 1615 are the principle actors in data transmissions, with specific components of a callback cloud 1610 or on-premise callback system 1615 handling data internally to the respective systems, and a consumer 1605 potentially using one of many common endpoints such as a cellphone, landline phone, PC, tablet, or laptop. An on-premise callback system 1615 may continuously co-maintain data including average call times for certain queues, agent availability, agent schedules, and more, with a callback cloud 1620, before a premise callback server may go offline and be unable to execute callbacks to consumers. In such an event, an on-premise failure message 1625 is sent to a callback cloud 1610, informing a callback cloud to execute any consumer callback requests 1630 to a consumer 1605, connecting agents and consumers with said callbacks as necessary. In such an event, the callback cloud may execute customer callbacks using the previously co-maintained data 1635, the callback object being used to attempt to open communications with the consumer 1605 and an on-premise agent. In the event of an on-premise callback server coming back online, current data regarding the brand and on-premise callback data is forwarded back to a premise callback system 1635, for example to update the server with data on completed and yet-to-complete callback requests.

Figure 17:
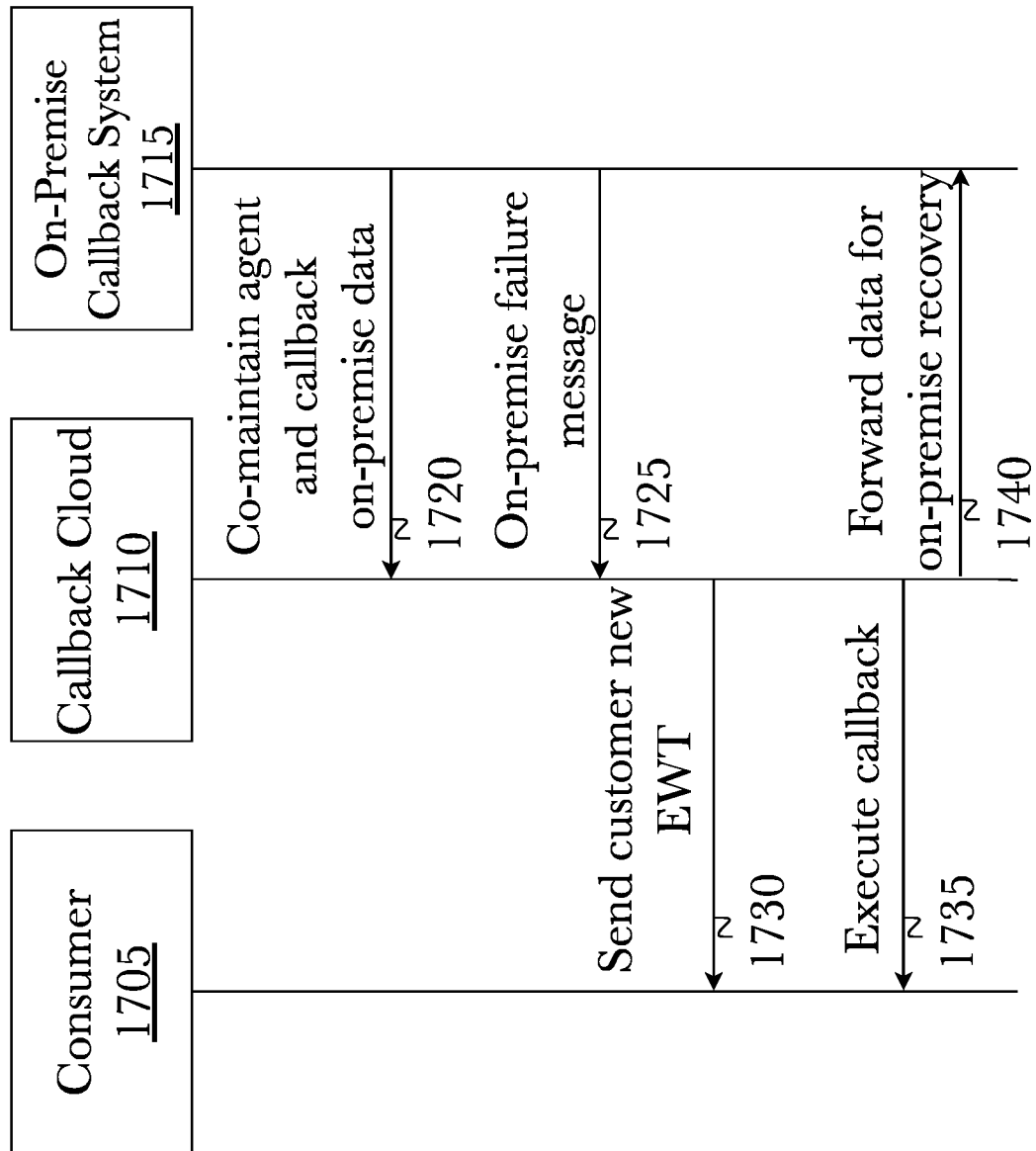
FIG. 17 is a message flow diagram illustrating the use of callback cloud services to aid in the recovery of an on-premise callback system in the event of a total system failure.

FIG. 17 is a message flow diagram illustrating the use of callback cloud services to aid in the recovery of an on-premise callback system in the event of a total system failure. A consumer 1705, callback cloud 1710, and on-premise callback system 1715 are the principle actors in data transmissions, with specific components of a callback cloud 1710 or on-premise callback system 1715 handling data internally to the respective systems, and a consumer 1705 potentially using one of many common endpoints such as a cellphone, landline phone, PC, tablet, or laptop. An on-premise callback system 1715 may continuously co-maintain data including average call times for certain queues, agent availability, agent schedules, and more, with a callback cloud 1720, before total on-premise callback system failure, such as by a power outage affecting their callback system equipment and services. In such an event, an on-premise failure message 1725 is sent to a callback cloud 1710, informing a callback cloud to first re-calculate customer Estimated Wait Times ("EWT") for customers, since call distribution has been interrupted and must now be accomplished by the cloud service. In such an event, the callback cloud may execute customer callbacks using the previously co-maintained data 1735, the callback object being used to attempt to open communications with the consumer 1705 and an on-premise agent. In the event of an on-premise callback server coming back online, current data regarding the brand and on-premise callback data is forwarded back to a premise callback system 1735, for example to update the server with data on completed and yet-to-complete callback requests.

Figure 18:
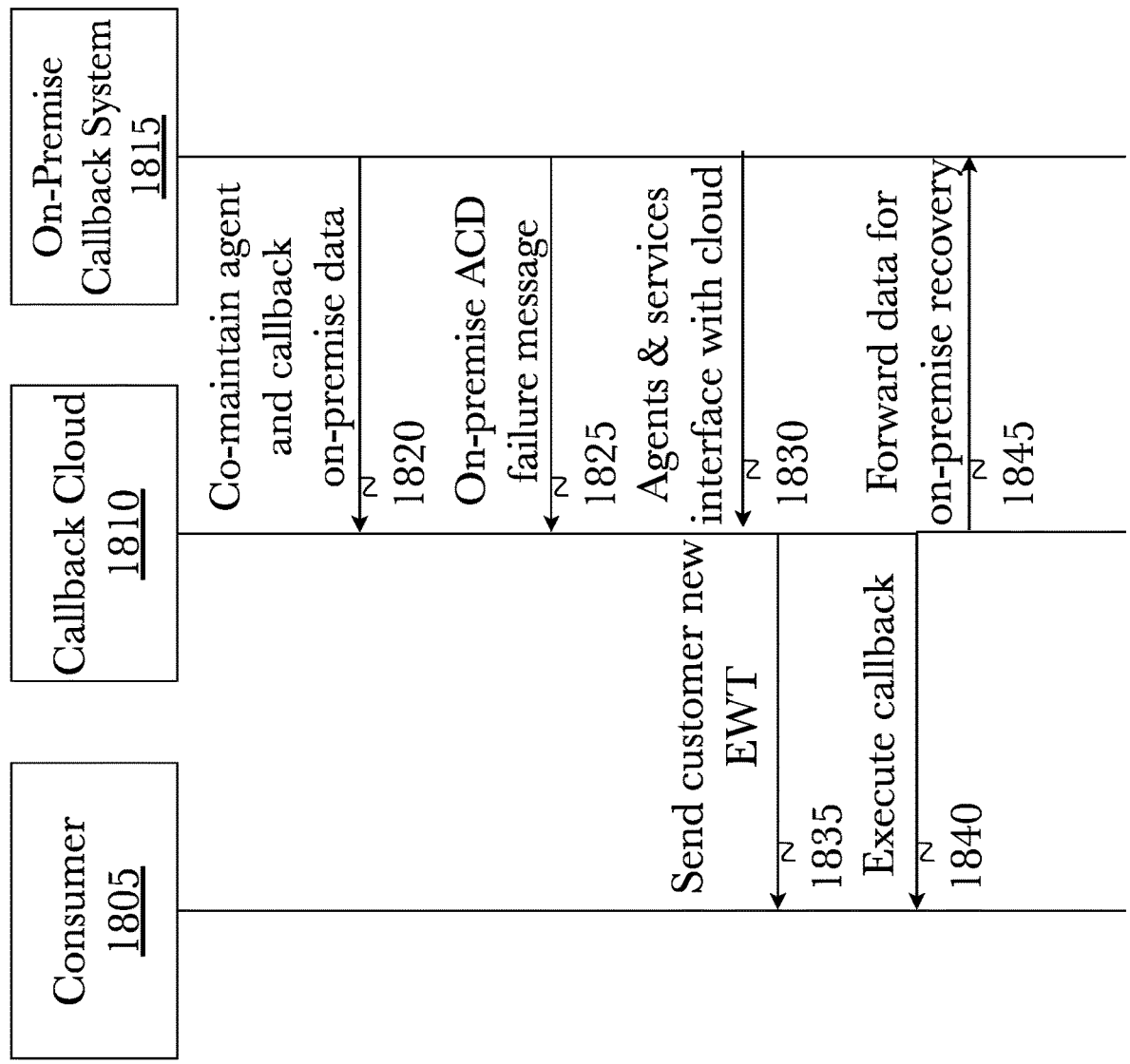
FIG. 18 is a message flow diagram illustrating the use of callback cloud services to aid in the recovery of an on-premise callback system in the event of a premise automatic call distribution and callback server failure.

FIG. 18 is a message flow diagram illustrating the use of callback cloud services to aid in the recovery of an on-premise callback system in the event of a premise automatic call distribution and callback server failure. A consumer 1805, callback cloud 1810, and on-premise callback system 1815 are the principle actors in data transmissions, with specific components of a callback cloud 1810 or on-premise callback system 1815 handling data internally to the respective systems, and a consumer 1805 potentially using one of many common endpoints such as a cellphone, landline phone, PC, tablet, or laptop. An on-premise callback system 1815 may continuously co-maintain data including average call times for certain queues, agent availability, agent schedules, and more, with a callback cloud 1820, before on-premise Automatic Call Distribution ("ACD") and callback servers may go offline and be unable to execute callbacks to consumers or adequately manage incoming calls. In such an event, an on-premise failure message 1825 is sent to a callback cloud 1810, informing a callback cloud to first re-calculate customer Estimated Wait Times ("EWT") for customers, since call distribution has been interrupted and must now be accomplished by the cloud service. In such an event, the callback cloud may execute customer callbacks using the previously co-maintained data 1835, the callback object being used to attempt to open communications with the consumer 1805 and an on-premise agent. In the event of an on-premise callback server coming back online, current data regarding the brand and on-premise callback data is forwarded back to a premise callback system 1835, for example to update the server with data on completed and yet-to-complete callback requests.

Figure 19:
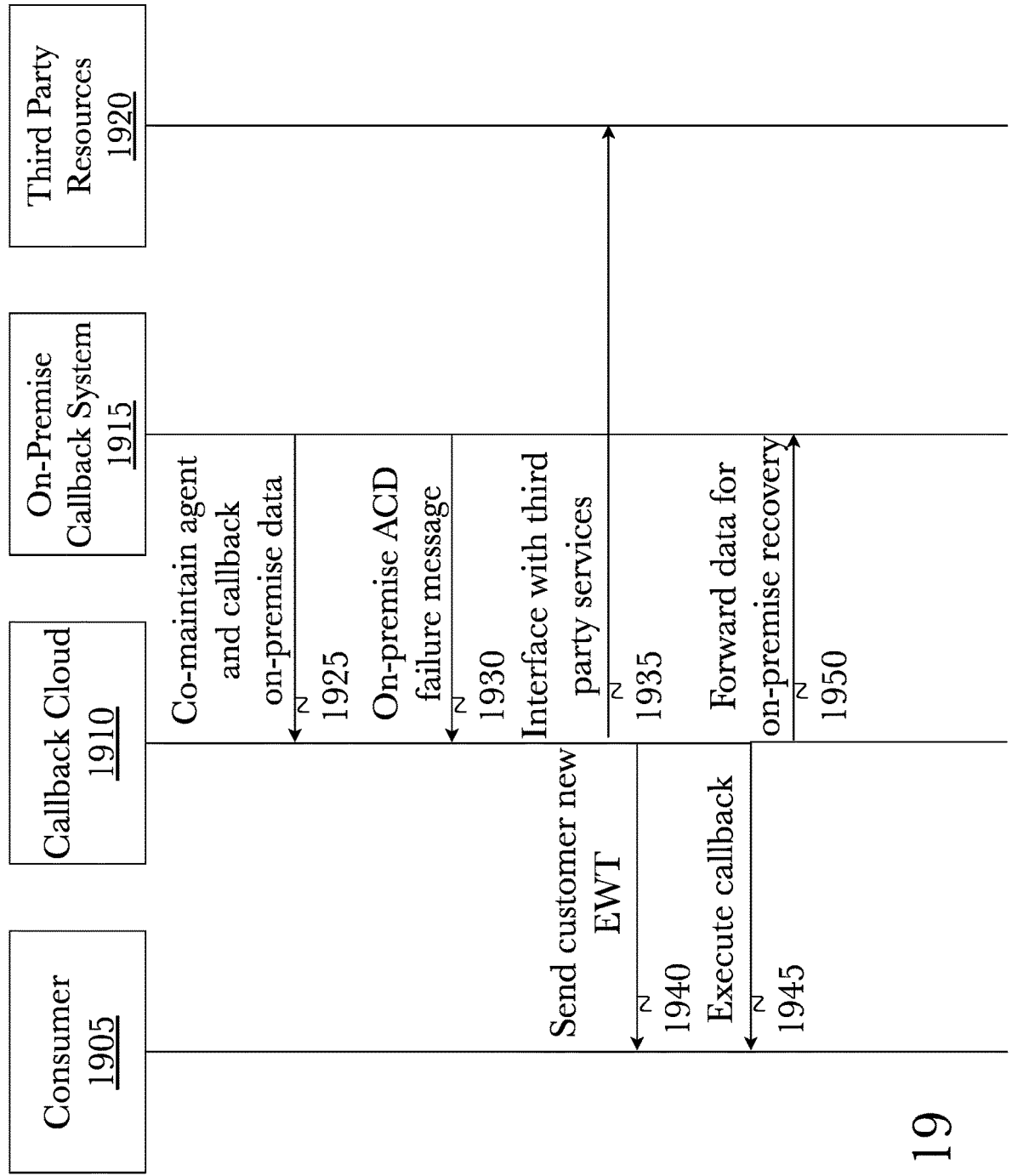
FIG. 19 is a message flow diagram illustrating the use of callback cloud services to aid in the recovery of an on-premise callback system in the event of a partial system failure, using a broker server to leverage third-party resources for failure recovery.

FIG. 19 is a message flow diagram illustrating the use of callback cloud services to aid in the recovery of an on-premise callback system in the event of a partial system failure, using a broker server to leverage third-party resources for failure recovery. A consumer 1905, callback cloud 1910, and on-premise callback system 1915 are the principle actors in data transmissions, with specific components of a callback cloud 1910 or on-premise callback system 1915 handling data internally to the respective systems, and a consumer 1905 potentially using one of many common endpoints such as a cellphone, landline phone, PC, tablet, or laptop. An on-premise callback system 1915 may continuously co-maintain data including average call times for certain queues, agent availability, agent schedules, and more, with a callback cloud 1920, before on-premise Automatic Call Distribution ("ACD") and callback servers may go offline and be unable to execute callbacks to consumers or adequately manage incoming calls. In such an event, an on-premise failure message 1925 is sent to a callback cloud 1910, informing a callback cloud to first re-calculate customer Estimated Wait Times ("EWT") for customers, since call distribution has been interrupted and must now be accomplished by the cloud service. In such an event, the callback cloud may execute customer callbacks using the previously co-maintained data 1935, the callback object being used to attempt to open communications with the consumer 1905 and an on-premise agent. In the event of an on-premise callback server coming back online, current data regarding the brand and on-premise callback data is forwarded back to a premise callback system 1935, for example to update the server with data on completed and yet-to-complete callback requests.

Figure 20:
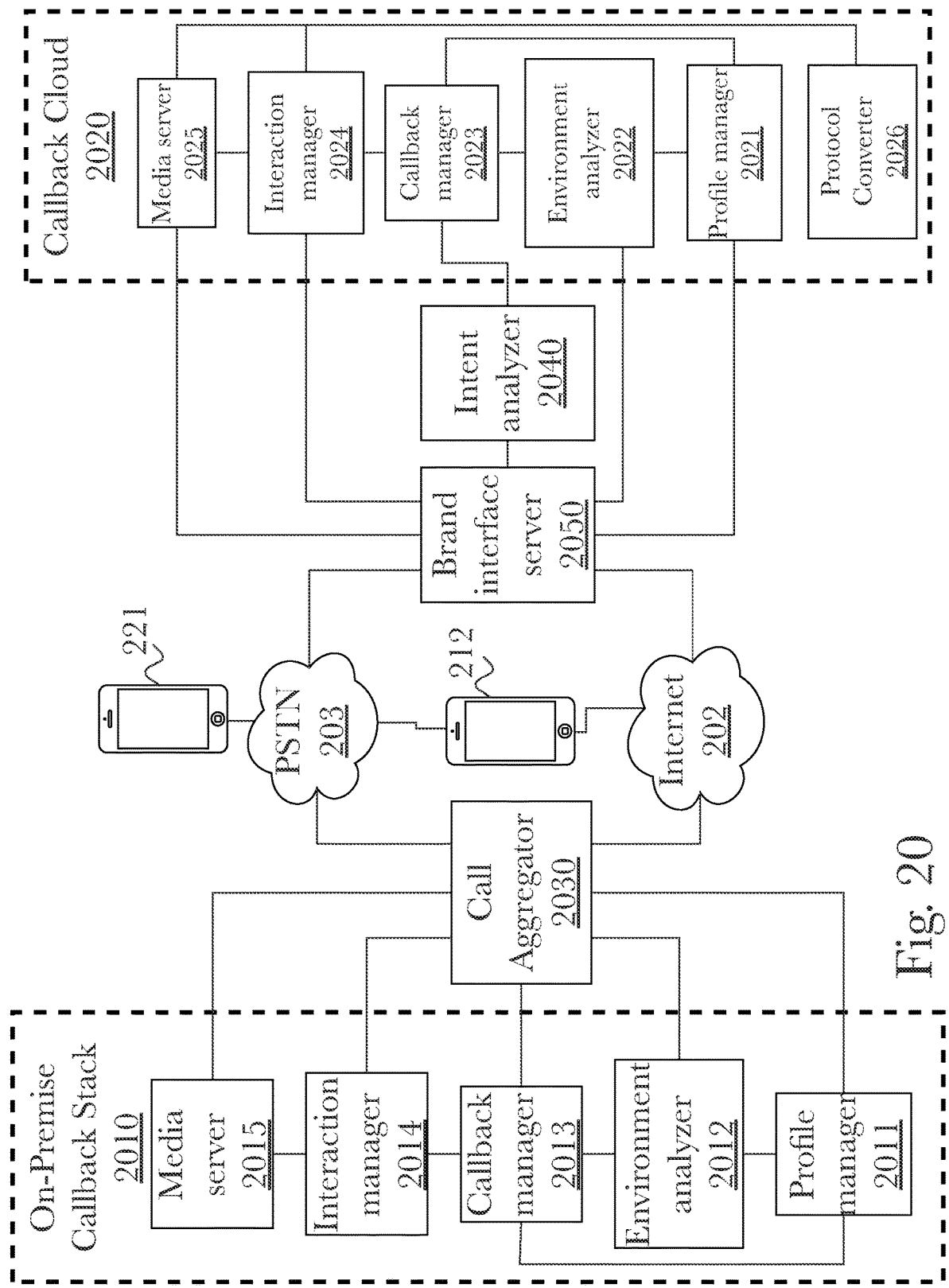
FIG. 20 is a block diagram illustrating an exemplary system architecture for a hybrid callback system operating with a callback cloud, an on-premise callback stack, and a protocol converter, according to an embodiment.

FIG. 20 is a block diagram illustrating an exemplary system architecture for a hybrid callback system operating with a callback cloud, an on-premise callback stack, and a protocol converter, according to an embodiment. According to this embodiment, an on-premise callback stack 2010 is shown, which contains multiple components, including a profile manager 2011, environment analyzer 2012, callback manager 2013, interaction manager 2014, and media server 2015, which are interconnected in various ways as depicted in the diagram, and connected to a call aggregator 2030 which aggregates user calls into queues using data received from an on-premise callback stack 2010, and allowing these aggregated and queued calls to then be managed by a callback manager 2013. A call aggregator may be connected to either of a PSTN 203 or the internet 202, or it may be connected to both and receive call data from both networks as needed. Further shown is a callback cloud 2020 which contains multiple similar components, including a profile manager 2021, environment analyzer 2022, callback manager 2023, interaction manager 2024, and media server 2025, which function as described in previous embodiments and, similarly to an on-premise callback stack 2010 may be interconnected in various ways as depicted in the diagram, and connected to either a PSTN 203 or the internet 202.

Present in this embodiment is a brand interface server 2050, which may expose the identity of, and any relevant API's or functionality for, any of a plurality of connected brands or on-premise callback components 2010 which may be responsible for operating related brands, to elements in a callback cloud 2020. In this way, elements of a callback cloud 2020 may be able to connect to, and interact more directly with, systems and applications operating in a business' infrastructure such as a SIP server, which may be interfaced with a profile manager 2021 to determine the exact nature of a user's profiles, sessions, and interactions in the system for added precision regarding their possible availability and most importantly, their identity. Also present in this embodiment is an intent analyzer 2040, which analyzes spoken words or typed messages from a user that initiated the callback request, to determine their intent for a callback. For example, their intent may be to have an hour-long meeting, which may factor into the decision by a callback cloud 2020 to place a call shortly before one or both users may be required to start commuting to or from their workplace. Intent analysis may utilize any combination of text analytics, speech-to-text transcription, audio analysis, facial recognition, expression analysis, posture analysis, or other analysis techniques, and the particular technique or combination of techniques may vary according to such factors as the device type or interaction type (for example, speech-to-text may be used for a voice-only call, while face/expression/posture analysis may be appropriate for a video call), or according to preconfigured settings (that may be global, enterprise-specific, user-specific, device-specific, or any other defined scope).

Also present in this embodiment is a protocol converter 2026, which can receive transmissions and/or related data (e.g., video calls, telephone calls, instant messaging, short-messaging service (SMS) and multimedia messaging service (MMS), etc.) from various networks such as (for example, but not limited to) PTSN 203, the Internet 202, and cellular networks, and convert the received transmission into a protocol appropriate for the desired endpoint. The desired endpoint may be a contact center agent workstation. The desired endpoint may be a consumer endpoint such as traditional telephones, smart wearables, cellular telephone, mobile tablet computing devices, laptop computers, or desktop personal computers (PC). In this way, callback cloud 2020 can provide support for mixed telephony interactions by providing a bridge between a consumer and an enterprise such as, for example, a contact center. For example, in operation, protocol converter 2026 may receive a VoIP call from a consumer device and convert the VoIP call-signaling data from its IP-format into a format that the PTSN 203 can understand. As another example, callback cloud 2020 may receive an SMS message and convert it into an instant chat message to be displayed in an instant chat messaging application that an enterprise (e.g., contact center) uses on their webapp or mobile device application. In this example, a the converted SMS message may indicate that the consumer wishes to continue the conversation via email exchange and the contact center agent receives this SMS via the instant messaging application and can respond using the instant message application. Protocol converter 2026 can receive the contact center agent's response message, convert it to an email format and send the email to the consumer. In this way, contact center agents need not transition from one communication medium to another in order to continue a conversation involving mixed telephony types.

In various implementations, callback cloud 2020 can provide a callback as a recovery from a dropped call between a consumer and a contact center agent or because of a network outage. Because callback cloud 2020 acts as a persistent layer monitoring and operating above the on-premise callback stack 2010, it can quickly and automatically shift to callback mode when a dropped call or network outage occurs causing the interaction and/or session between a consumer and an agent resulting in a sudden loss of connection. Interaction manager 2024 can be configured to be communicatively coupled to interaction manager 2014 in order to monitor a plurality of interactions that may be happening concurrently via on-premise callback stack 2010.

When a loss of connection is detected, interaction manager 2023 can notify callback manager 2023 of the loss of connection and also provide data related to the dropped call and/or interaction. This data may comprise consumer information such as a consumer name and phone number as well as other information such as the identity of the agent who was connected to the consumer prior to the dropped call, such that when a callback occurs, the consumer and the same agent can be reconnected quickly with minimal disruption to the consumer and contact center.

Figure 21:
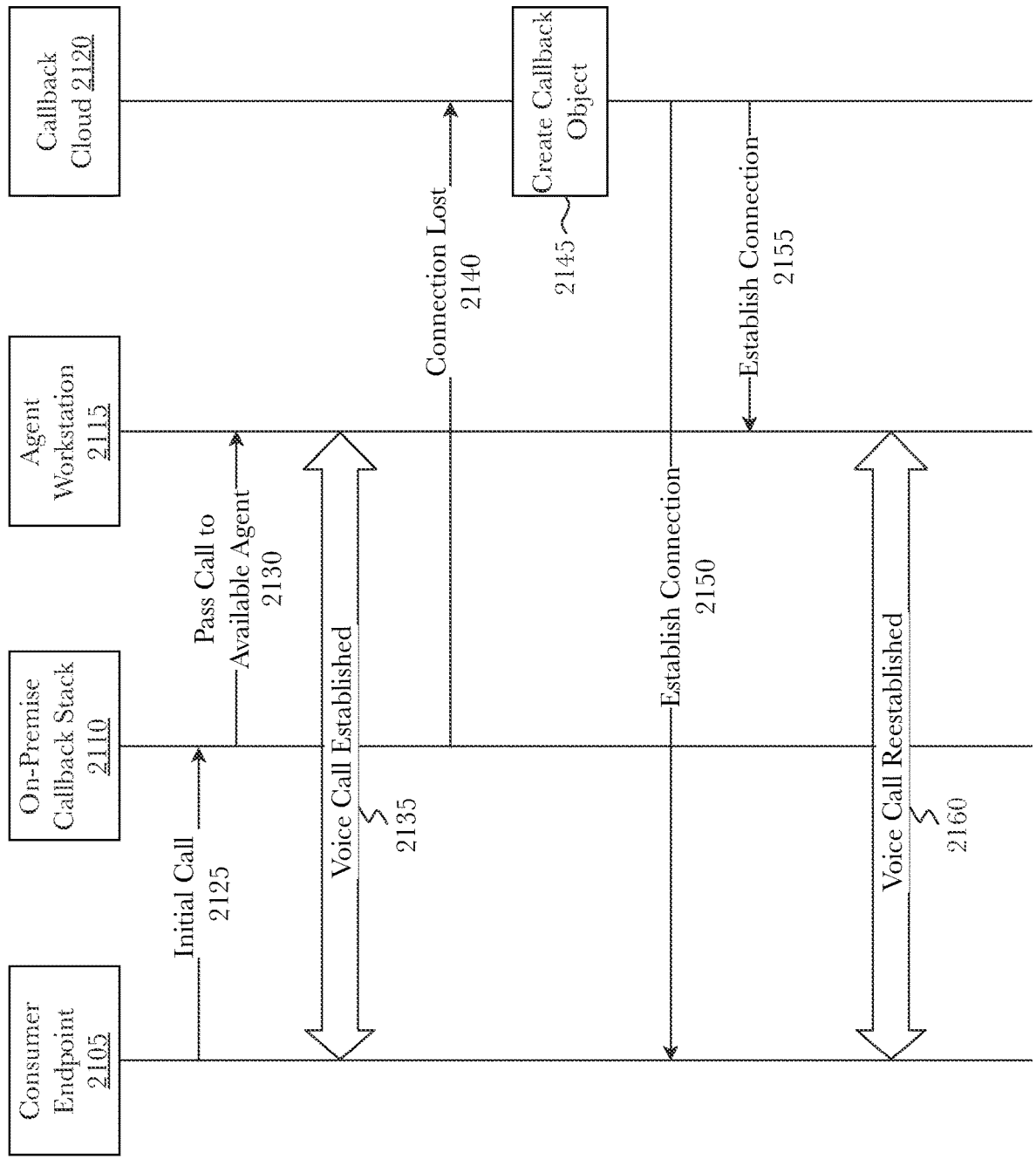
FIG. 21 is a flow diagram illustrating an exemplary method for triggering an automated callback between a consumer device and an agent in the event of a loss of connection, according to an embodiment.

FIG. 21 is a flow diagram illustrating an exemplary method for triggering an automated callback between a consumer device and an agent in the event of a loss of connection, according to an embodiment. According to the embodiment, an initial call 2125 is generated from a consumer endpoint 2105 (e.g., a consumer telephone, cellphone, VoIP call, etc.) to a contact center (or any enterprise which utilizes the disclosed system) and is first received by a on-premise callback stack 2110 located at the contact center. On-premise callback stack 2110 may receive the call and analyze it for intent and environmental context before routing the call to an available agent 2130 at an agent workstation 2115. Once the agent is connected to the consumer a voice call has been established 2135 and the consumer and agent may converse, share data, and work to resolve the issue which prompted the consumer to place the initial call to the contact center. While the voice call is taking place, on-premise callback stack 2110 may monitor the call for various reasons such as to monitor for dropped calls or a network outage. Simultaneously, callback cloud 2120 provides a layer of support above and to on-premise callback stack 2110. In the event of a dropped call or network outage on-premise callback stack 2110 can generate a message or alert indicating a lost connection 2140 to callback cloud 2120. In some implementations, callback cloud 2120, by acting as the support layer to on-premise callback stack 2110, need not receive an indication of lost connection from the on-premise callback stack and may be aware of the lost connection via its monitoring capabilities. In either case, callback cloud 2120 automatically starts a callback process by creating a callback object 2145. The callback object may contain information related to the call that was dropped or otherwise disconnected such as the consumer's name, telephone number, and the reason for the initial call, if available, as well as information about the agent who was on call with the consumer. As a next step, callback cloud 2120 performs the callback by first establishing a connection to the consumer 2150 and then establish a connection with the agent workstation 2155. The callback may be performed as a voice call between the consumer and the agent, but other communication and telephony types may be used to establish a connection. For example, if the connection between the consumer and the agent is lost because there was an issue with the PTSN, then the callback may be performed using a VoIP channel, if applicable. As another example, if the initial call was a VoIP call between the consumer and the agent and the connection is lost due to an Internet disruption, then the callback may be performed using SMS messages sent to the consumer's mobile device. Once a connection has been made to both the consumer endpoint 2105 and agent workstation 2115 the callback cloud may bridge the call between the two (or more) parties resulting in the reestablishment of the voice call 2160. Callback cloud 2120 can perform these steps autonomously and responsively to a lost connection during a call/interaction between consumer and an agent.

Figure 22:
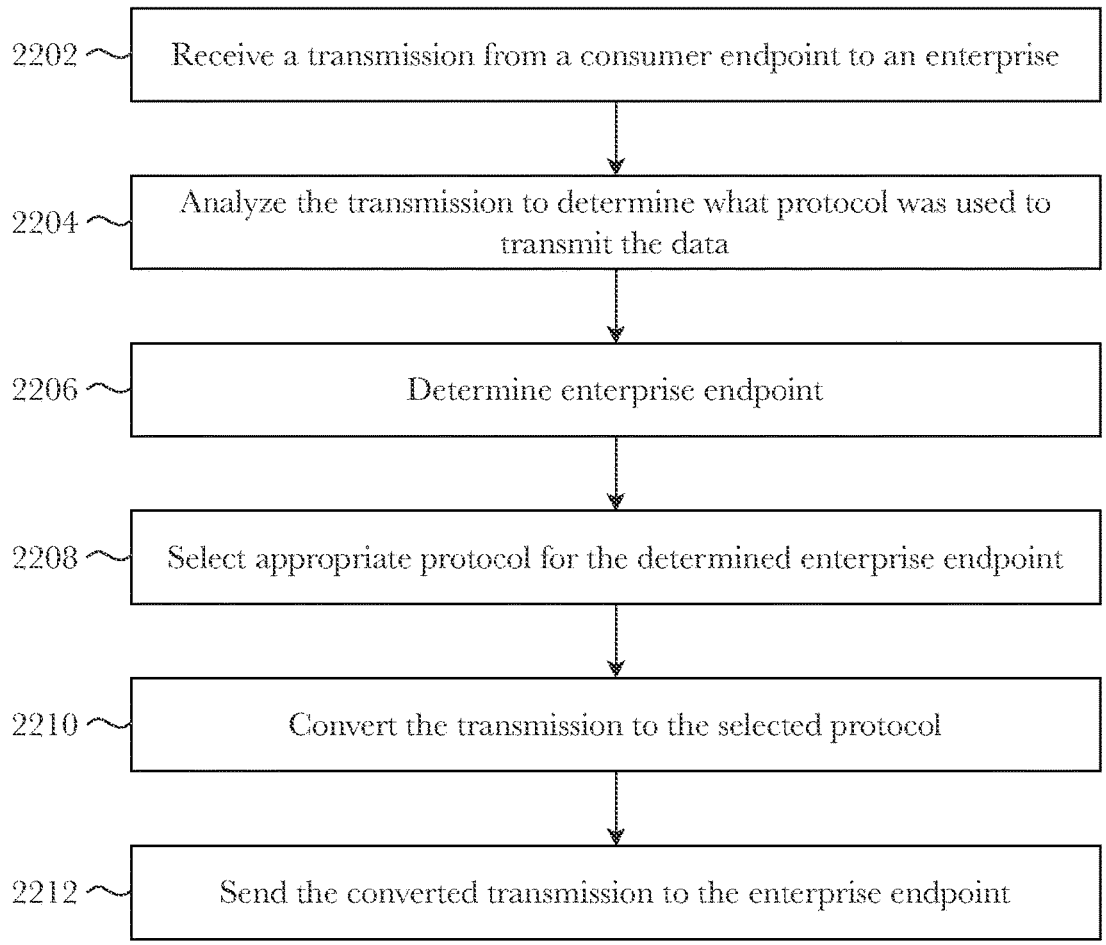
FIG. 22 is a flow diagram illustrating an exemplary method for utilizing mixed telephony types, according to an embodiment.

FIG. 22 is a flow diagram illustrating an exemplary method for utilizing mixed telephony types, according to an embodiment. According to the embodiment, the process begins at step 2202 when a callback cloud 2020 receives a transmission from a consumer endpoint to an enterprise (e.g., contact center). The transmission may be a voice call (e.g., wireline or wireless), a video call, an SMS/MMS message, an instant chat message, etc. Protocol converter 2026 may analyze the transmission to determine what protocol type was used to transmit the data 2204. Then, protocol converter may determine the which enterprise endpoint the received transmission is to be sent to 2206 such as an agent workstation in a contact center environment. In some implementations, protocol converter may not need to determine the enterprise endpoint because another system component, interaction manager 2024, can be configured to provide this information to protocol converter 2026 when the transmission is first received. Once the proper enterprise endpoint has been determined, the appropriate protocol for the determined enterprise endpoint is selected 2208. This may be selected by searching a database comprising a list of a plurality of enterprise endpoints and the protocols associated with each of the plurality of enterprise endpoints. Protocol converter 2026 may then use the selected appropriate protocol to convert the transmission data to the selected protocol 2210 based on the selected protocol. Once the data transmission has been converted, it may be sent at step 2212 to the enterprise endpoint. This process may happen in real-time, for example, in the case of voice data (i.e., a call made over VoIP converted to a PTSN) being transmitted via telephone call between a consumer and a contact center agent.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 23:
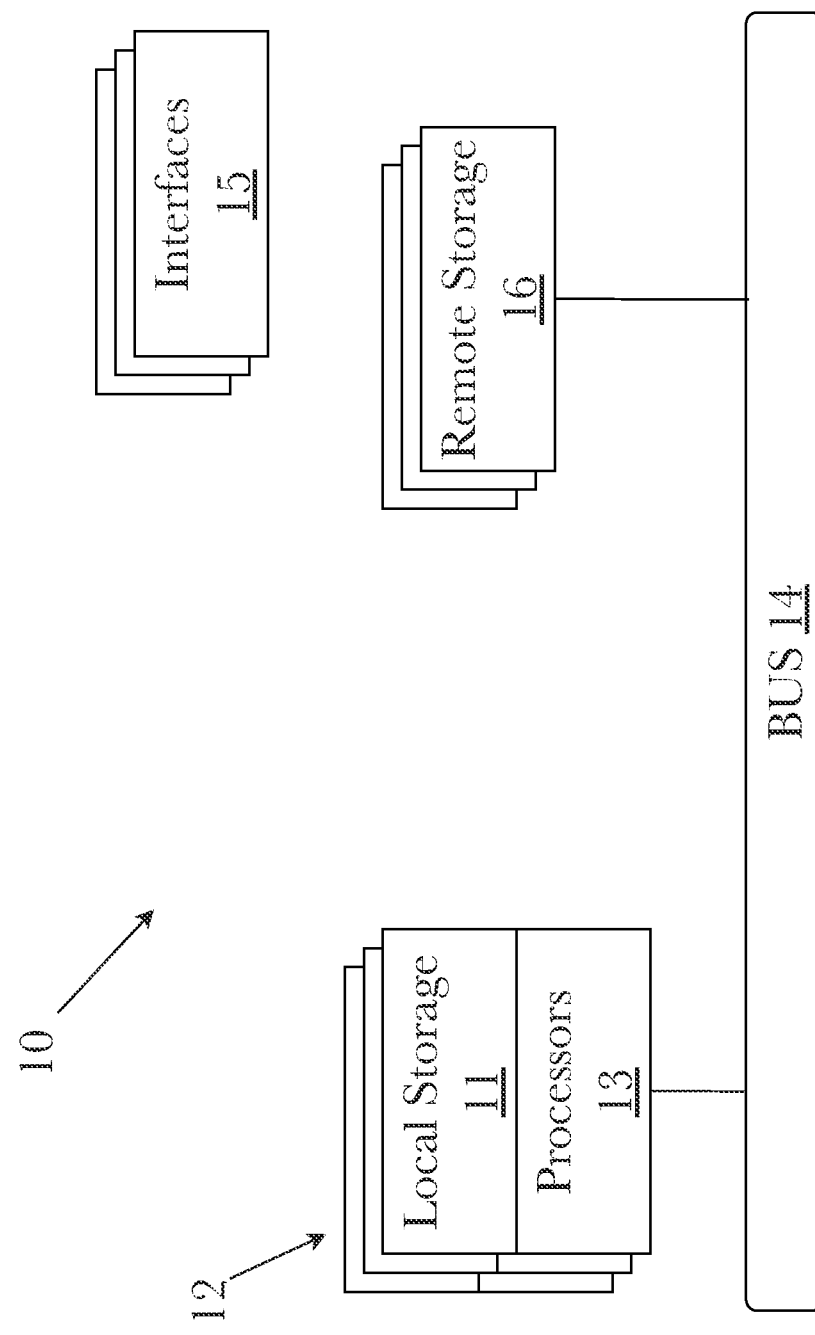
FIG. 23 is a block diagram illustrating an exemplary hardware architecture of a computing device.

Referring now to FIG. 23, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 23 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 24:
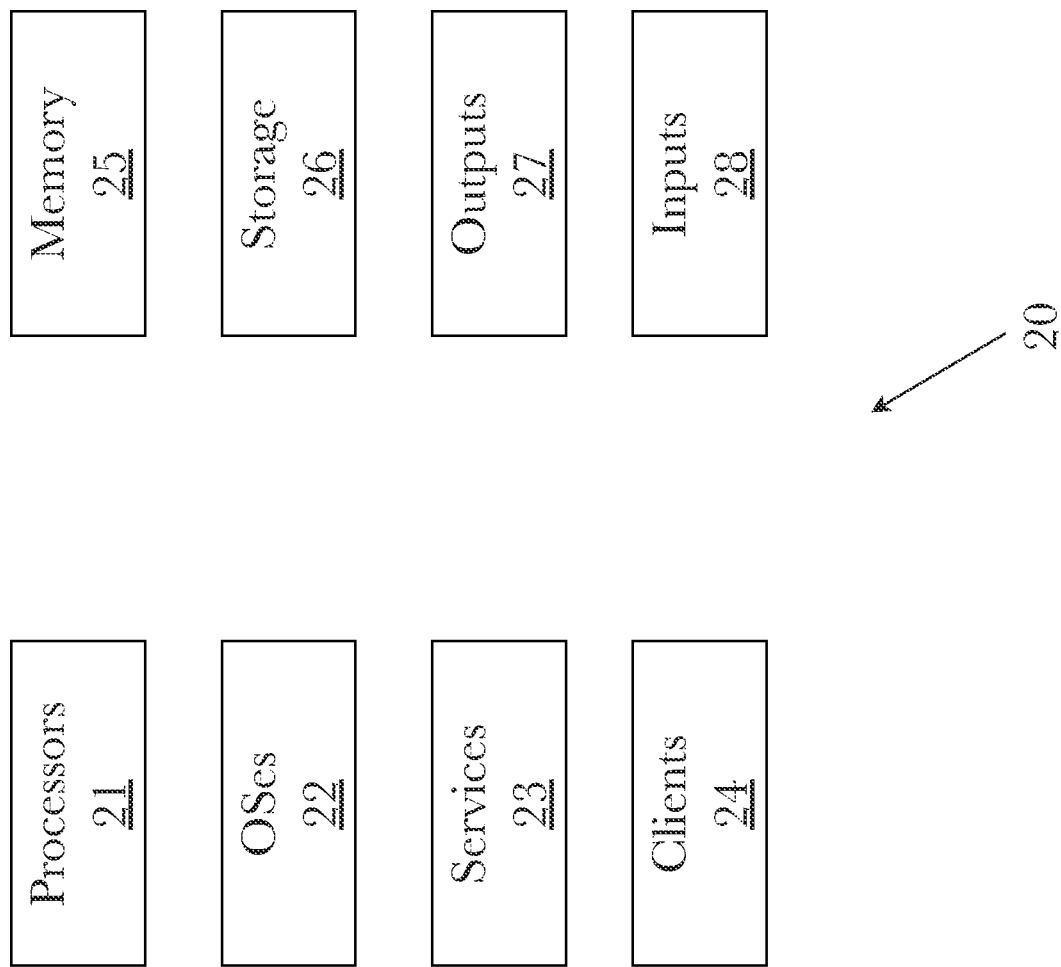
FIG. 24 is a block diagram illustrating an exemplary logical architecture for a client device.

In some embodiments, systems according to the present invention may be implemented on a standalone computing system. Referring now to FIG. 24, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 23). Examples of storage devices 26 include flash memory, magnetic hard drive, CD-ROM, and/or the like.

Figure 25:
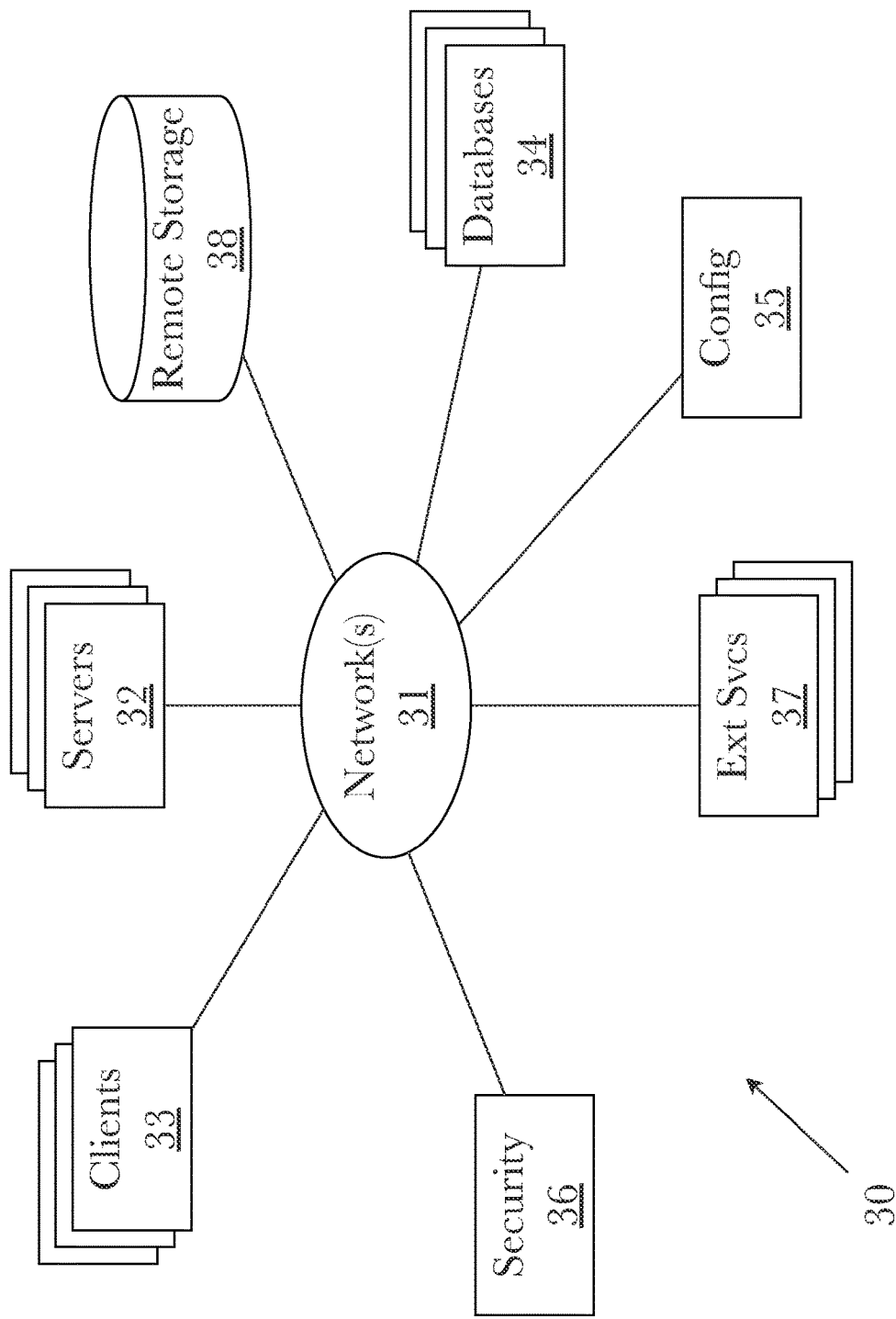
FIG. 25 is a block diagram showing an exemplary architectural arrangement of clients, servers, and external services.

In some embodiments, systems of the present invention may be implemented on a distributed computing network, such as one having any number of clients and/or servers. Referring now to FIG. 25, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 24. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 26:
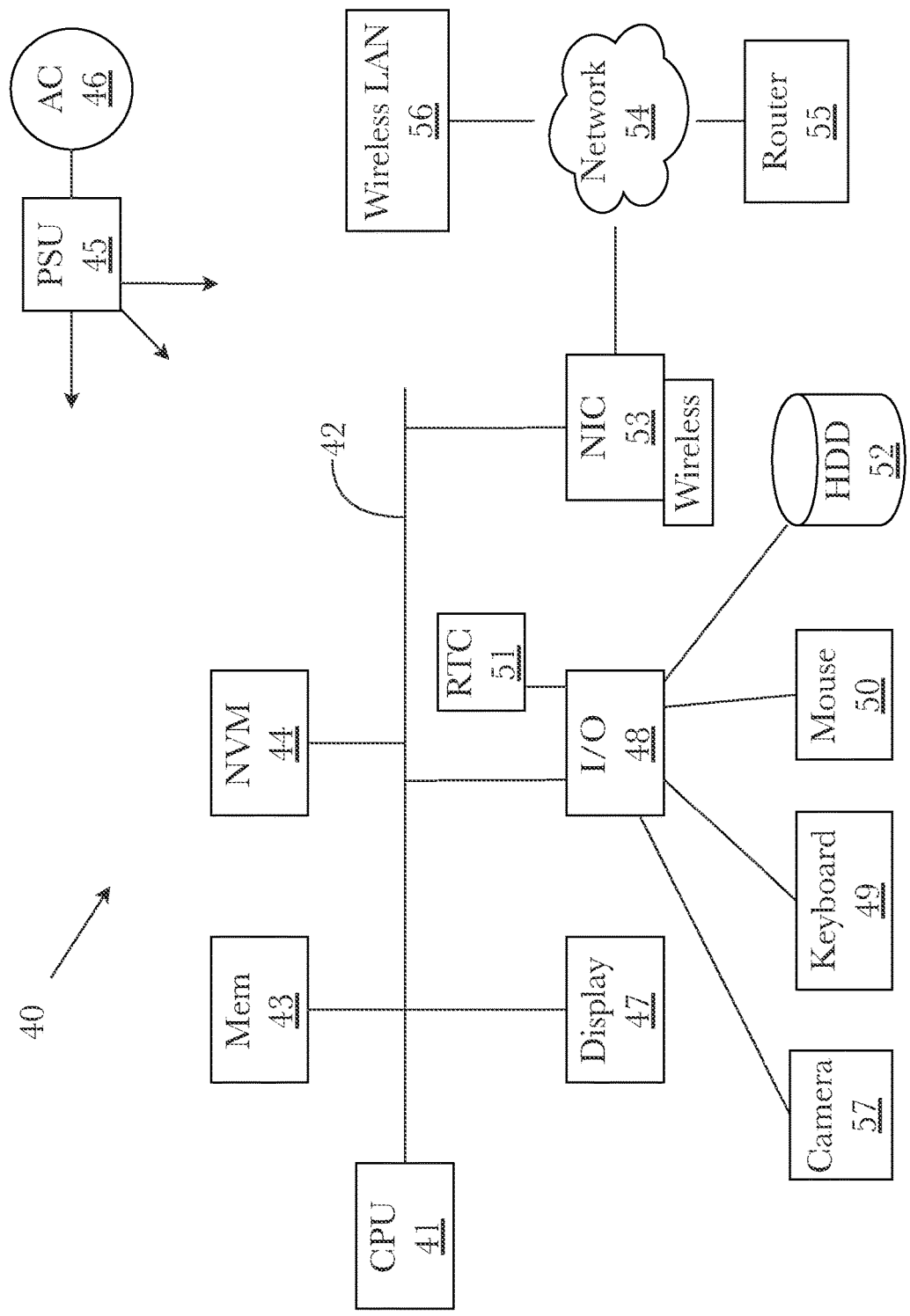
FIG. 26 is another block diagram illustrating an exemplary hardware architecture of a computing device.

FIG. 26 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for hybrid callback management, comprising:
a callback cloud service comprising at least a processor, a memory, and a first plurality of programming instructions stored in the memory and operating on the processor, wherein the first programming instructions, when operating on the processor, cause the processor to:
maintain relevant agent and brand data from an on-premise callback system;
execute callback requests;
calculate estimated wait times for callbacks; and
an on-premise callback system comprising at least a processor, a memory, and a second plurality of programming instructions stored in the memory and operating on the processor, wherein the second programming instructions, when operating on the processor, cause the processor to:
send data related to callback objects and agents to a callback cloud service;
create a callback object upon a consumer requesting a call back;
execute callbacks between consumers and agents at a specified time; and
connect the two parties, when the two first and second called parties are online, and delete the callback object.

2. The system of claim 1, further comprising a broker server comprising at least a processor, a memory, and a third plurality of programming instructions stored in the memory and operating on the processor, wherein the third programming instructions, when operating on the processor, cause the processor to:
interface with third party contact center services; and
utilize these services in periods of on-premise callback system failure.

3. The system of claim 1, wherein the callback cloud is further configured to:
monitor a call between a consumer and an agent for a loss of connection;
wherein the loss of connection occurs create a callback object; and
execute a callback between the consumer and the agent.

4. The system of claim 1, wherein the callback cloud is further configured to:
receive a consumer transmission to a brand;
determine an enterprise endpoint to route the consumer transmission;
select a protocol associated with the enterprise endpoint;
convert the consumer transmission to the selected protocol; and
send the converted consumer transmission to the enterprise endpoint.

5. The system of claim 4, wherein the callback cloud is further configured to analyze the consumer transmission to determine a communication protocol associated with the consumer transmission.

6. The system of claim 4, wherein the consumer transmission is received via a telephone or voice over Internet protocol.

7. A method for hybrid callback management and failure recovery, comprising the steps of:
maintain relevant agent and brand data from an on-premise callback system, using the callback cloud service;
executing callback requests, using the callback cloud service;
calculating estimated wait times for callbacks, using the callback cloud service;
sending data related to callback objects and agents to the callback cloud service, using the on-premise callback system;
creating a callback object upon a consumer requesting a call back, using the on-premise callback system;
executing callbacks between consumers and agents at a specified time, using the on-premise callback system; and
connecting the two parties, when the two first and second called parties are online, and deleting the callback object, using the on-premise callback system.

8. The method of claim 7, further comprising a broker server comprising at least a processor, a memory, and a third plurality of programming instructions stored in the memory and operating on the processor, wherein the third programming instructions, when operating on the processor, cause the processor to:

interface with third party contact center services; and
utilize these services in periods of on-premise callback system failure.

9. The method of claim 7, further comprising the steps of:
monitoring a call between a consumer and an agent for a loss of connection, using the callback cloud;
wherein the loss of connection occurs creating a callback object, using the callback cloud; and
executing a callback between the consumer and the agent, using the callback cloud.

10. The method of claim 7, further comprising the steps of:
receiving a consumer transmission to a brand, using the callback cloud;
determining an enterprise endpoint to route the consumer transmission, using the callback cloud;
selecting a protocol associated with the enterprise endpoint, using the callback cloud;
converting the consumer transmission to the selected protocol, using the callback cloud; and
sending the converted consumer transmission to the enterprise endpoint, using the callback cloud.

11. The method of claim 10, further comprising the step of analyzing the consumer transmission to determine a communication protocol associated with the consumer transmission.

12. The method of claim 10, wherein the consumer transmission is received via a telephone or voice over Internet protocol.

* * * * *